US011936535B2

(12) United States Patent
In et al.

(10) Patent No.: US 11,936,535 B2
(45) Date of Patent: Mar. 19, 2024

(54) SERVER AND ELECTRONIC DEVICE FOR TRANSMITTING AND RECEIVING STREAM DATA AND METHOD FOR OPERATING THE SAME

(71) Applicant: Samsung Electronics Co., Ltd., Gyeonggi-do (KR)

(72) Inventors: Jeongsik In, Gyeonggi-do (KR); Hanmin Bang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 17/865,680

(22) Filed: Jul. 15, 2022

(65) Prior Publication Data

US 2023/0138794 A1 May 4, 2023

Related U.S. Application Data

(63) Continuation of application No. PCT/KR2022/009009, filed on Jun. 24, 2022.

(30) Foreign Application Priority Data

Oct. 29, 2021 (KR) .................. 10-2021-0147093

(51) Int. Cl.
*H04L 43/0852* (2022.01)
*H04L 41/50* (2022.01)
*H04L 43/16* (2022.01)

(52) U.S. Cl.
CPC ...... *H04L 41/5032* (2013.01); *H04L 43/0852* (2013.01); *H04L 43/16* (2013.01)

(58) Field of Classification Search
CPC . H04L 41/5032; H04L 43/0852; H04L 43/16; H04L 43/0864; H04L 43/0876;
(Continued)

(56) References Cited

U.S. PATENT DOCUMENTS 6,198,728 B1 3/2001 Hulyalkar et al.
7,925,781 B1 * 4/2011 Chan ................. H04L 69/166
709/217
(Continued)

FOREIGN PATENT DOCUMENTS

JP 5291803 B2 9/2013
KR 10-0633267 B1 5/2007
(Continued)

OTHER PUBLICATIONS

International Search Report dated Sep. 23, 2022.

*Primary Examiner* — Thu Ha T Nguyen
(74) *Attorney, Agent, or Firm* — Cha & Reiter, LLC

(57) ABSTRACT

Various embodiments may provide a server including a communication circuit, and at least one processor. The at least one processor is configured to receive report information on a delay time of each of multiple pieces of sub-stream data, identify a second external electronic device transmitting a particular piece of sub-stream data of the multiple pieces of sub-stream data to the first external electronic device, identify a first delay time of the particular piece of sub-stream data associated with the second external electronic device, and a second delay time of the particular piece of sub-stream data associated with a third external electronic device, and determine, based on the first delay time and the second delay time, whether the second external electronic device or the third external electronic device is to transmit the particular piece of sub-stream data to the first external electronic device. Various other embodiments are possible.

20 Claims, 18 Drawing Sheets

(58) Field of Classification Search
CPC ..... H04L 43/10; H04L 45/121; H04L 45/122; H04L 45/123; H04L 47/283; H04L 63/1408
USPC .................................................. 709/223, 224
See application file for complete search history.

(56) References Cited

U.S. PATENT DOCUMENTS

| | | | |
|---|---|---|---|
| 9,641,566 B1* | 5/2017 | Hiremath | H04N 21/4334 |
| 9,654,329 B2* | 5/2017 | Chan | H04L 65/00 |
| 10,015,068 B2 | 7/2018 | Maenpaa et al. | |
| 10,771,524 B1* | 9/2020 | Long | H04L 67/568 |
| 10,892,997 B2* | 1/2021 | Ruffini | H04L 47/27 |
| 11,032,122 B2 | 6/2021 | Liu et al. | |
| 11,089,051 B1* | 8/2021 | Long | H04L 63/1458 |
| 2007/0211767 A1* | 9/2007 | Todd | H04L 65/762 |
| | | | 370/508 |
| 2010/0153575 A1* | 6/2010 | Liu | H04L 65/80 |
| | | | 709/231 |
| 2011/0243024 A1* | 10/2011 | Osterling | H04L 67/104 |
| | | | 370/252 |
| 2012/0188233 A1* | 7/2012 | Shuster | G06T 15/20 |
| | | | 345/419 |
| 2015/0036695 A1* | 2/2015 | Gowda | H04L 47/32 |
| | | | 370/474 |
| 2015/0189539 A1 | 7/2015 | Li et al. | |
| 2015/0358368 A1 | 12/2015 | Wiseman et al. | |
| 2017/0017532 A1* | 1/2017 | Falco | G06F 9/546 |
| 2017/0115372 A1* | 4/2017 | Abinader, Jr. | G01S 5/0226 |
| 2017/0118119 A1* | 4/2017 | Testicioglu | H04L 43/0864 |
| 2017/0118769 A1* | 4/2017 | Abinader, Jr. | G01S 5/0289 |
| 2019/0104169 A1* | 4/2019 | Wu | H04L 67/10 |
| 2019/0132370 A1 | 5/2019 | Ahn et al. | |
| 2020/0229124 A1* | 7/2020 | Soriaga | G01S 5/0289 |
| 2021/0004171 A1 | 1/2021 | Li et al. | |
| 2023/0138794 A1* | 5/2023 | In | H04L 43/10 |
| | | | 709/224 |

FOREIGN PATENT DOCUMENTS

| | | |
|---|---|---|
| KR | 10-2009-0097034 A | 9/2009 |
| KR | 10-2011-0119229 A | 11/2011 |
| KR | 10-1231208 B1 | 2/2013 |
| KR | 10-2016-0102211 A | 8/2016 |
| KR | 10-2020-0070349 A | 6/2020 |
| KR | 10-2153611 B1 | 9/2020 |
| KR | 10-2021-0077841 A | 6/2021 |

* cited by examiner

SERVER AND ELECTRONIC DEVICE FOR TRANSMITTING AND RECEIVING STREAM DATA AND METHOD FOR OPERATING THE SAME

CROSS-REFERENCE TO RELATED APPLICATION(S)

This application is a continuation of International Application No. PCT/KR2022/009009, which was filed on Jun. 24, 2022, and claims priority to Korean Patent Application No. 10-2021-0147093, filed on Oct. 29, 2021, in the Korean Intellectual Property Office, the disclosure of which are incorporated by reference herein their entirety.

BACKGROUND

Technical Field

Various embodiments of the disclosure relate to a server for transmitting and receiving stream data, an electronic device related to same, and a method for operating the same.

Background Art

Electronic devices have recently been developed rapidly, and electronic devices that enable wireless voice communication and information exchange have become daily necessities. In the early stage of development, electronic devices have been simply regarded as portable and capable of wireless communication, but line with development of technologies and introduction of wireless Internet, electronic devices not only have simple usages such as telephone communication and scheduling, but also have increasing ranges of usage, such as gaming, remote control based on short-range communication, and image capture by equipped digital cameras, thereby satisfying user demands.

Particularly, online lifestyle has recently been widespread, and electronic devices thus have increasing demands in connection with services based on real-time communication, such as multi-party video conferencing.

In order to efficiently provide real-time multi-party communication services that have increasing demands, there is a need to implement technology for improving various factors such as the transmission quality of real-time multi-party communication, and the cost for operating networks for the transmission quality.

SUMMARY

A client device that wants to receive multi-party communication service (for example, multi-party video conferencing service), may directly transmit and/or receive data with another client device in real time by using peer-to-peer (P2P) based communication scheme. Electronic devices using the multi-party communication service may be referred to as node devices. The P2P-based communication scheme between node devices does not need a remote server device to be implemented to transmit and/or receive data and thus has a cost-related advantage, but may have problems in terms of transmission quality because, if the number of node devices increases, it becomes difficult to identify information related to transmission quality of each node device in real time. For example, data transmission delay may occur, depending on the ever-changing positions of the node devices participating in the service in real time. However, it is difficult to identify transmission delay with regard to each node device in the P2P-based communication scheme, and transmission quality may be degraded (for example, data reception delayed) if data transmission continues between node devices in which a large transmission delay exists. In other words, there may be problems of degraded transmission quality if a multi-party communication service is used in real time according to a P2P-based communication scheme.

According to various embodiments, a server may include a communication circuit, and at least one processor; wherein the at least one processor is configured to establish communication with multiple external electronic devices by using the communication circuit, receive report information on a delay time of each of multiple pieces of sub-stream data associated with particular stream data from a first external electronic device in the multiple external electronic devices by using the communication circuit, identify a second external electronic device transmitting a particular piece of sub-stream data of the multiple pieces of sub-stream data to the first external electronic device, identify, based on the report information, a first delay time of the particular piece of sub-stream data associated with the second external electronic device, and a second delay time of the particular piece of sub-stream data associated with a third external electronic device different from the second external electronic device in the multiple external electronic devices, and determine, based on the first delay time and the second delay time, whether the second external electronic device or the third external electronic device is to transmit the particular piece of sub-stream data to the first external electronic device.

According to various embodiments, an electronic device may include a communication circuit, a camera, a microphone, and at least one processor, wherein the at least one processor is configured to receive information on multiple external electronic devices from a server by using the communication circuit, obtain stream data, based on the camera and/or the microphone, partition the stream data into multiple pieces of sub-stream data, sequentially transmit the multiple pieces of sub-stream data to at least one first external electronic device according to a first period, and transmit a message including information on a transmission time point of each of the multiple pieces of sub-stream data to at least one second external electronic device different from the at least one first external electronic device in the multiple external electronic devices according to a second period.

According to various embodiments, an electronic device may include a communication circuit, a camera, a microphone, and at least one processor; wherein the at least one processor is configured to calculate a delay time of each of multiple pieces of sub-stream data associated with particular stream data according to a designated first period, based on information on generation time points and reception time points of the multiple pieces of sub-stream data, and transmit, according to a designated second period and to a server, information on an average delay time of each of the multiple pieces of sub-stream data, which is identified based on the calculated delay time of each of the multiple pieces of sub-stream data.

Technical solutions according to various embodiments are not limited to the above-described solutions, and solutions not mentioned herein will be clearly understood from the specification and accompanying drawings by those skilled in the art to which the disclosure pertains.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to certain embodiments, a server, an electronic device, and a method for operating the same may control the communication scheme between node devices to be P2P-based or server-based, thereby timely reducing the server cost and/or improving the transmission quality.

In addition, according to certain embodiments, a server, an electronic device, and a method for operating the same may collect information related to the state of each of node devices (for example, information regarding delay time, information regarding subscription/withdrawal), and may control communication of each of the node devices based on the collected information, thereby efficiently using resources of the node devices to provide services.

Figure 1:
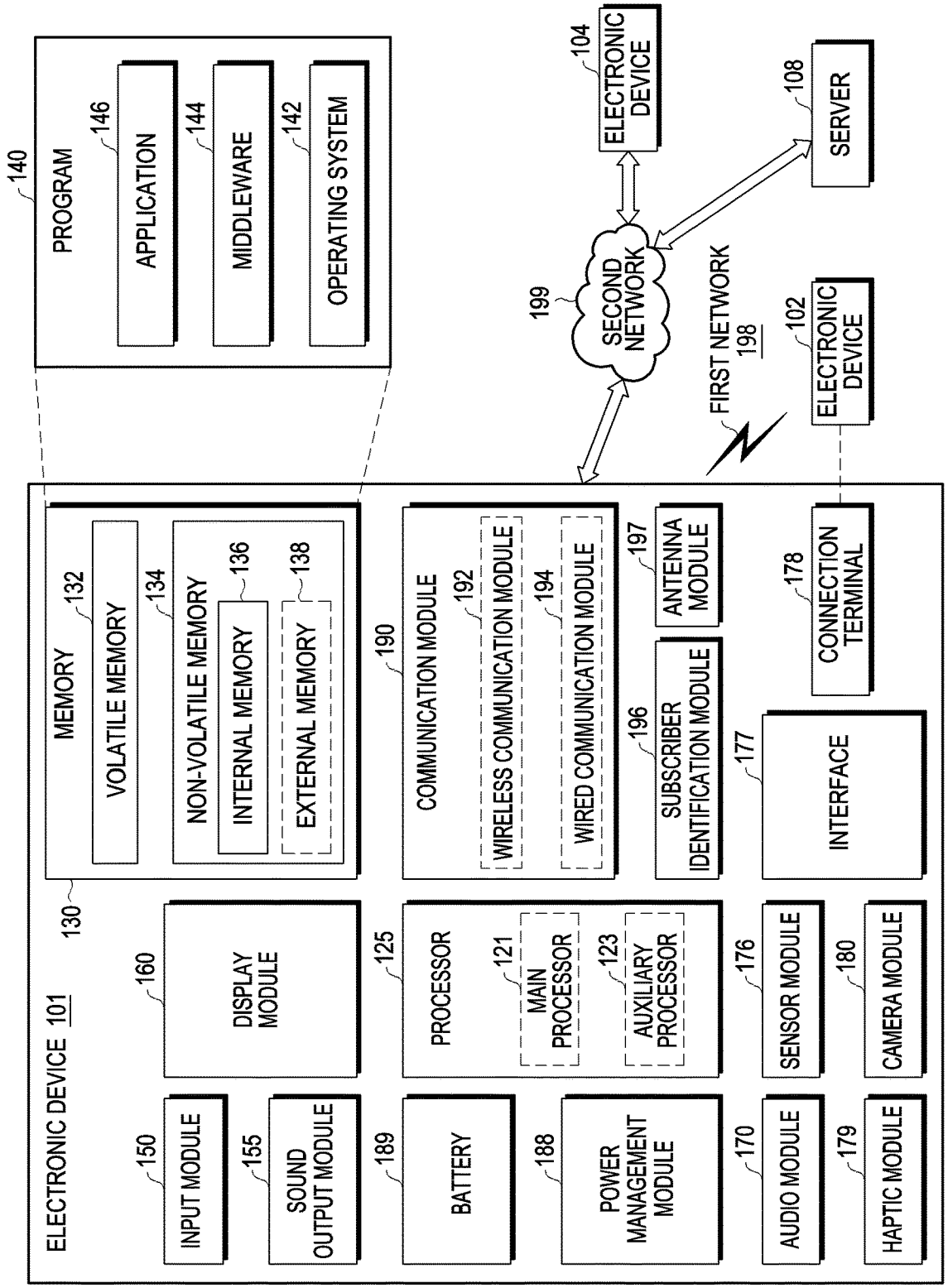
FIG. 1 is a block diagram of an electronic device in a network environment according to various embodiments.

FIG. 1 is a block diagram illustrating an electronic device 101 in a network environment according to various embodiments. Referring to FIG. 1, the electronic device 101 in the network environment may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 125, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 125 may execute, for example, software (e.g., a program 140) to control at least one other component (e.g., a hardware or software component) of the electronic device 101 coupled with the processor 125, and may perform various data processing or computation. According to one embodiment, as at least part of the data processing or computation, the processor 125 may store a command or data received from another component (e.g., the sensor module 176 or the communication module 190) in volatile memory 132, process the command or the data stored in the volatile memory 132, and store resulting data in non-volatile memory 134. According to an embodiment, the processor 125 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 125 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 125) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 125 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, an electronic device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 125) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an example of devices (e.g., a server device 100 (hereinafter, server) and a node device) according to various embodiments will be described. The description for the electronic device 101 given with reference to FIG. 1 may be employed in the description for devices (e.g., the server 100 and a client device 200) given below, and thus duplicative description will be omitted.

Figure 2:
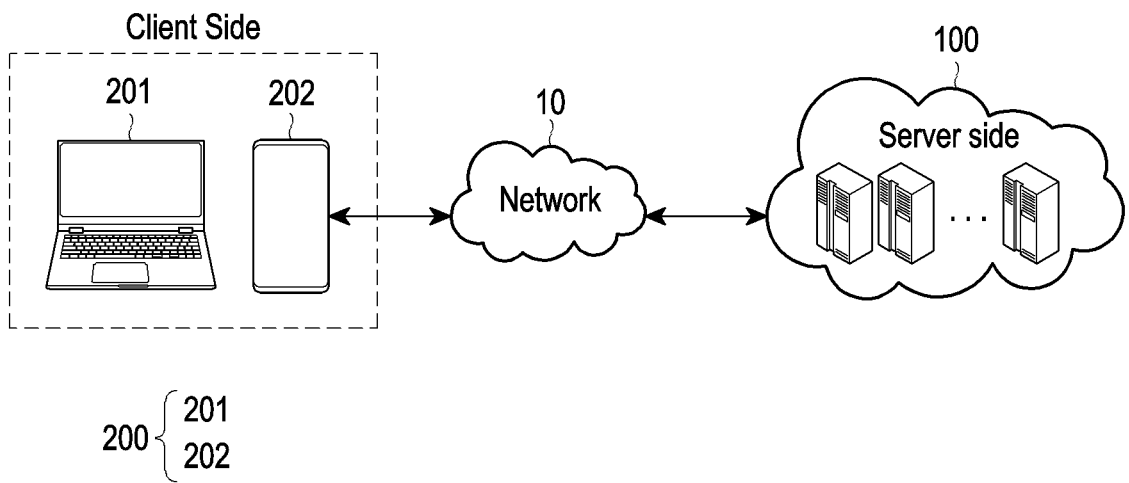
FIG. 2 is a diagram illustrating an example of devices (e.g., a server and a client device) according to various embodiments.

FIG. 2 is a diagram illustrating an example of devices (e.g., the server 100 and the client device 200) according to various embodiments.

According to various embodiments, referring to FIG. 2, the server 100 and the client devices 200 may perform multilateral real-time communication via a network 10, so as to provide one or more predetermined services. The services may include multilateral voice/video call service and multilateral video conference service. However, the services are not limited thereto, and may include various types of services performed between multiple people in real time. Furthermore, to the extent these services are known, detailed description thereof will be omitted. The network may be a communication network implemented based on a wireless communication scheme, such as a communication establishment scheme (e.g., 3G, 4G/LTE, and 5G) using cellular communication using a base station, a communication establishment scheme (e.g., Wi-Fi communication) using an access point (AP), and/or a communication establishment scheme (e.g., Wi-Fi direct, and Bluetooth) by which direct communication is established. However, the network is not limited thereto, and may also be a communication network implemented based on a wired communication establishment scheme.

According to various embodiments, the server 100 may perform an operation for providing a service (e.g., voice/video call service and multilateral conference service) to the client device 200. The server 100 may perform operations allowing the client devices 200 to transmit and/or receive data (e.g., stream data described later). For example, the server 100 may include a transmission server (e.g., a transmission server 120 in FIG. 3A and FIG. 3B) which receives data from one client device 200, and transfers the received data to another client device 200. For another example, the server 100 may include a control server (e.g., control server 110 in FIG. 3A and FIG. 3B) which determines the other client 200 which is to receive data from the one client device 200. The control server 110 and the transmission server 120 will be described more with reference to FIG. 3A and FIG. 3B. The control server 110 and the transmission server 120 may be implemented as physically different servers. However, the control server 110 and the transmission server 120 are not limited thereto, and respective functions of the control server 110 and the transmission server 120 may be implemented in the single server 100. Besides inclusion of the control server 110 and the transmission server 120, the server 100 may perform various other functions (or operations) for providing services, and this will be described later.

According to various embodiments, the client device 200 may be a user's various types of electronic devices 201 and 202 which may receive the service (e.g., voice/video call service and multilateral conference service). For example, the client device 200 may generate (or obtain) data (e.g., stream data) in real time by using an input device, and may transmit the data generated in real time to another client device 200 or the server according to control of the control server 110 and the transmission server 120 of the server. An example of the operations of the client device 200 will be described later.

Hereinafter, an example of a node device and the server 100 (e.g., the control server 110 and the transmission server 120) which controls a communication path of the node device will be described.

Figure 3A:
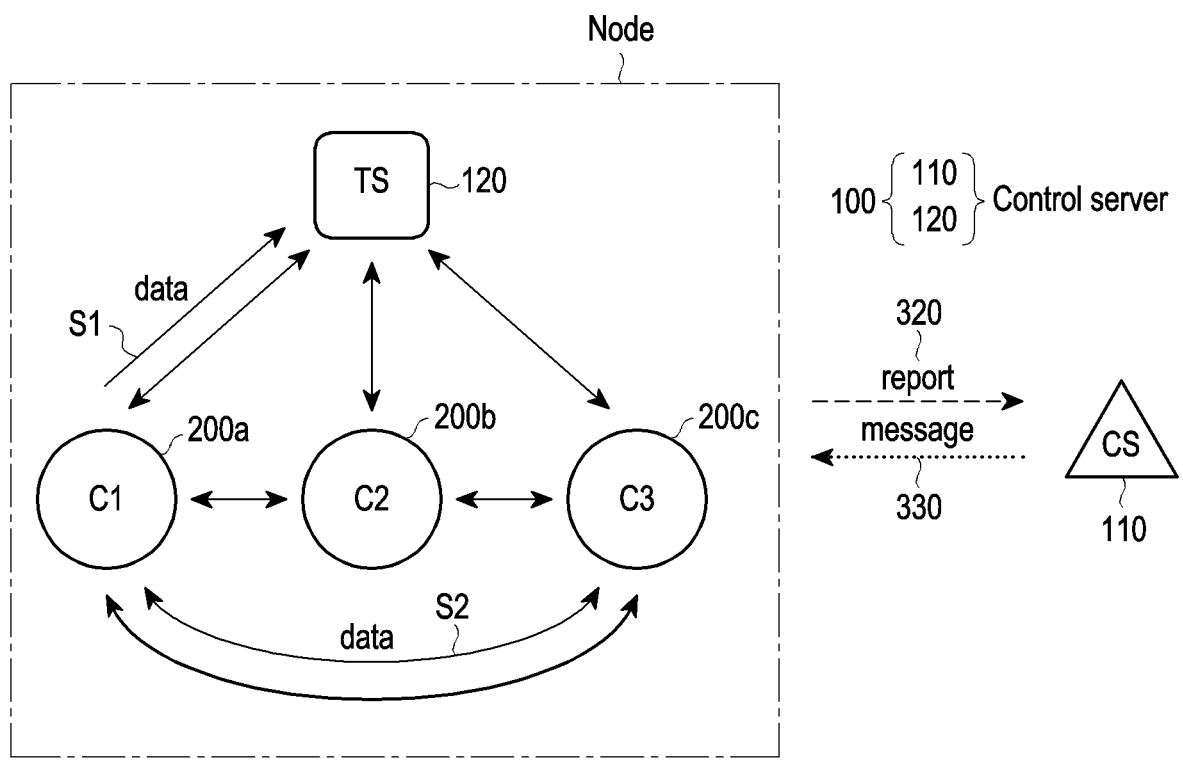
FIG. 3A is a diagram illustrating an example of a node device (node) and a control server according to various embodiments.

FIG. 3A is a diagram illustrating an example of a node device (node) and the control server 110 according to various embodiments. Hereinafter, the description for FIG. 3A may also reference FIG. 3B.

Figure 3B:
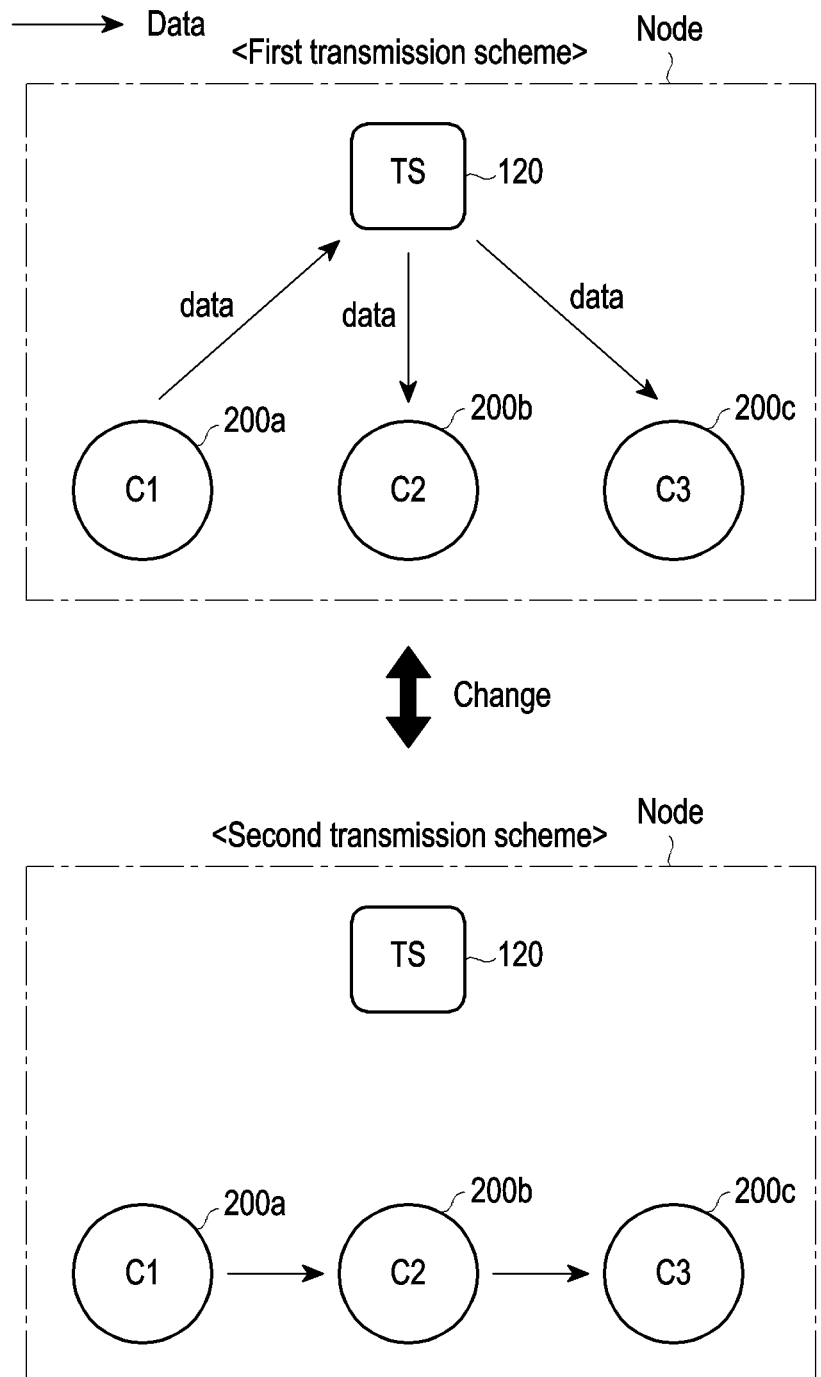
FIG. 3B is a diagram illustrating examples of a transmission scheme of node devices according to various embodiments.

FIG. 3B is a diagram illustrating examples of a transmission scheme of node devices according to various embodiments.

According to various embodiments, referring to FIG. 3A, node devices may transmit and/or receive data to or from each other in real time, based on a message received from the control server 110.

According to various embodiments, the node devices may be defined as devices which transmit and/or receive data (e.g., stream data or packet data) to or from each other. As illustrated in FIG. 3A, the node device may include the transmission server 120 and the client devices 200*a*, 200*b*, and 200*c*. However, more or fewer transmission servers 120 and client devices 200 may perform operations as node devices without being limited to the number thereof illustrated in FIG. 3A. For example, multiple transmission servers may be implemented as the transmission server 120 without being limited to the illustration. Each of the node devices may establish communication to each other, and may transmit and/or receive data to each other, based on the established communication. The data may include sub-stream data (stream data) and/or probe packet data. The stream data and the probe packet will be described later.

According to various embodiments, a communication path for data may indicate a path connecting one node device and another node device transmitting data (e.g., sub-stream data and/or probe packet data) to the one node device in real time. Alternatively, the communication path may indicate a path connecting one node device and another node device receiving data from the one node device in real time. The node device receiving data may be defined as a lower node, and the node device transmitting data may be defined as a higher node. For example, referring to FIG. 3A, communication paths associated with the first client device 200*a* may include a first communication path (S1) for which the second client device 200*b* is the higher node and the first client device 200*a* is the lower node, and a second communication path (S2) for which the first client device 200*a* is the higher node and the transmission server 120 is the lower node. For convenience of explanation, the first communication path (S1), among communication paths for the first client device 200*a*, which has the first client device 200*a* as the lower node may be defined as a reception path, and the second communication path (S2) having the first client device 200*a* as the higher node may be defined as a transmission path. Referring to FIG. 3B, the type of the communication path (e.g., transmission path and reception path) may include a communication path based on a first transmission scheme (e.g., server scheme) and a communication path based on a second transmission scheme (e.g., peer-to-peer (P2P) scheme). For example, the first communication path based on the server scheme may indicate that one node device (e.g., the client device 200 or the transmission server 120) transmits data to another node device (e.g., the client device 200 or the transmission server 120) via the transmission server 120. For example, the second communication path based on the peer-to-peer (P2P) scheme may indicate that one node device (e.g., the client device 200 or the transmission server 120) transmits data to another node device (e.g., the client device 200 or the transmission server 120) via the client device 200. The larger the number of node devices using the first communication path based on the server scheme, the relatively higher transmission/processing capability implemented for the control server 110 compared to that of the client device 200, whereby service quality can be ensured. In addition, the larger the number of node devices using the second communication path based on the P2P scheme, the smaller the burden (or cost) required to manage the control server 110. That is, there is an advantage for each of the types of communication paths, and this will be described later. However, the control server 110 may control communication paths of node devices according depending on various factors, so that service quality and server burden can be optimally controlled.

According to various embodiments, a communication path of a node device may be controlled by the control server 110. For example, as illustrated in FIG. 3A, each of the multiple node devices 120, 200*a*, 200*b*, and 200*c* may periodically transmit, to the control server 110, report information 320 including delay times of pieces of data received from the other node devices. For example, the report information 320 may include pieces of information on delay times associated with each of communication paths (e.g., the transmission path and the reception path) associated with one node. The control server 110 may determine whether to maintain a current communication path for data of each of the multiple node devices 120, 200*a*, 200*b*, and 200*c*, and/or change the current communication path into a communication path having a lower delay time, based on the report information 320 periodically received from each of the multiple node devices 120, 200*a*, 200*b*, and 200*c*. Based on the determination, the control server 110 may transmit a message 330 for change of the communication path to each of the multiple node devices 120, 200*a*, 200*b*, and 200*c*. A node device having received the message 330 may change the communication path to receive data from another node device or transmit data to another node device. As illustrated in FIG. 3B, according to a control of the control server 110, the type of the communication path of a node device may be changed from a communication path based on the server scheme to a communication path based on the p2p scheme, or may be changed from a communication path based on the p2p scheme to a communication path based on the server scheme. The communication path of each node device is dynamically configured to be proper for a situation by a control operation of the control server 110 as described above, whereby traffic can be optimally distributed, and increase in data transmission quality or reduction of server cost can be achieved to be proper for a situation according to change in the type of the communication path. The operations of the control server 110 will be described in detail later.

Hereinafter, an example of elements of devices according to various embodiments will be described.

Figure 4A:
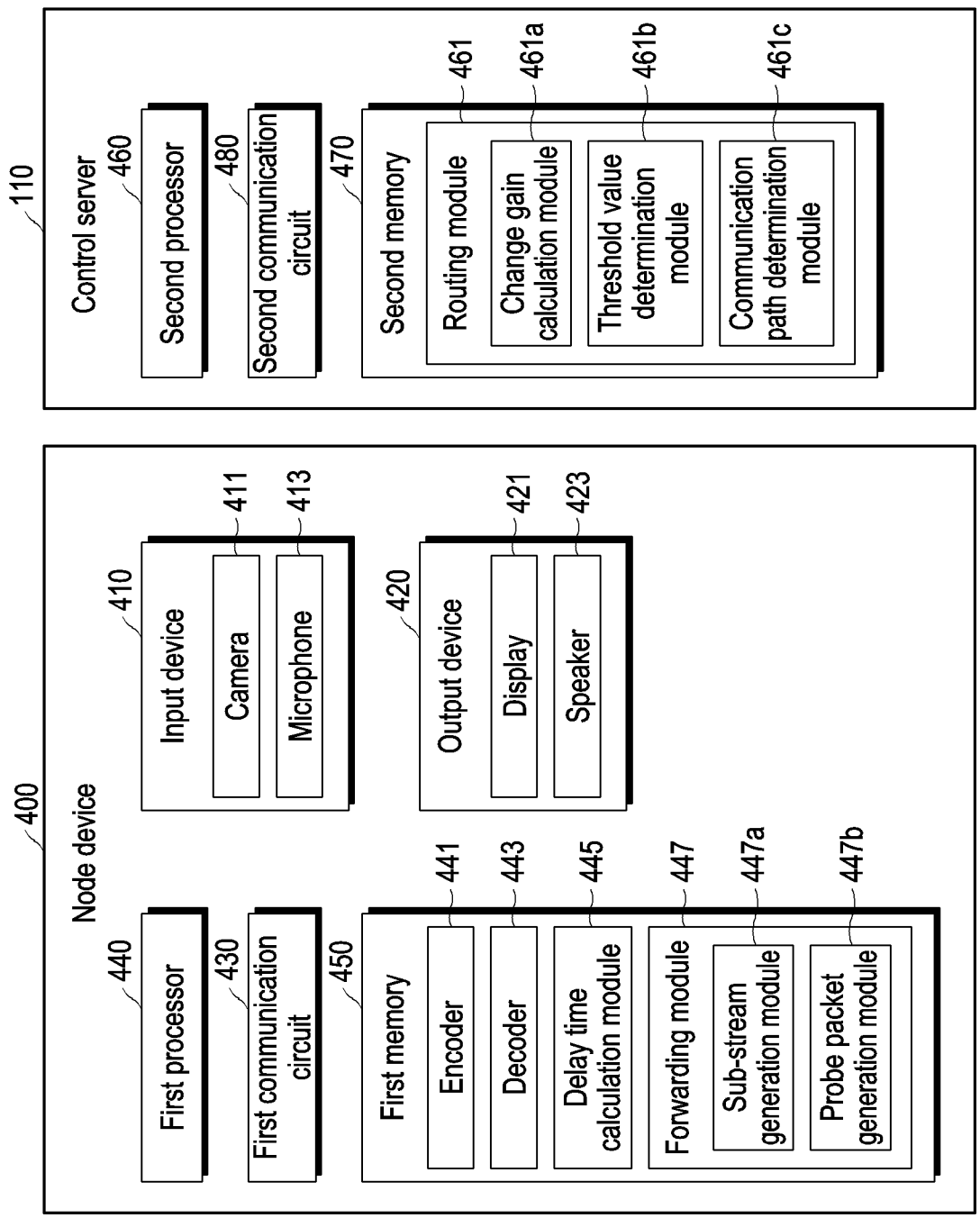
FIG. 4A is a diagram illustrating an example of elements of a node device and a control server according to various embodiments.
Figure 4B:
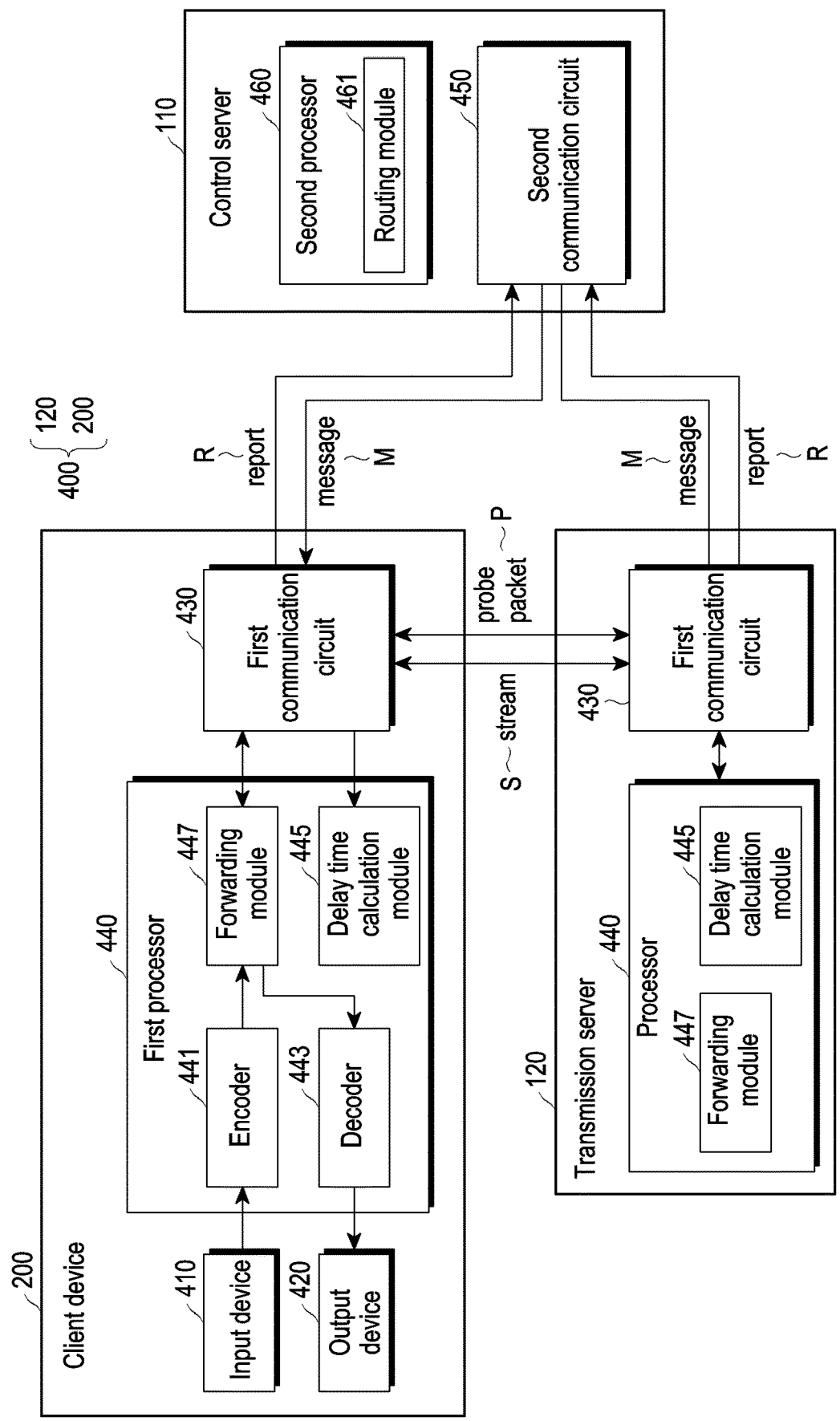
FIG. 4B is a diagram illustrating an example of elements of a client device, a transmission server, and a control server according to various embodiments.

FIG. 4A is a diagram illustrating an example of elements of a node device 400 and the control server 110 according to various embodiments. FIG. 4B is a diagram illustrating an example of elements of the client device 200, the transmission server 120, and the control server 110 according to various embodiments. Hereinafter, FIG. 5 will be referred to.

Figure 5:
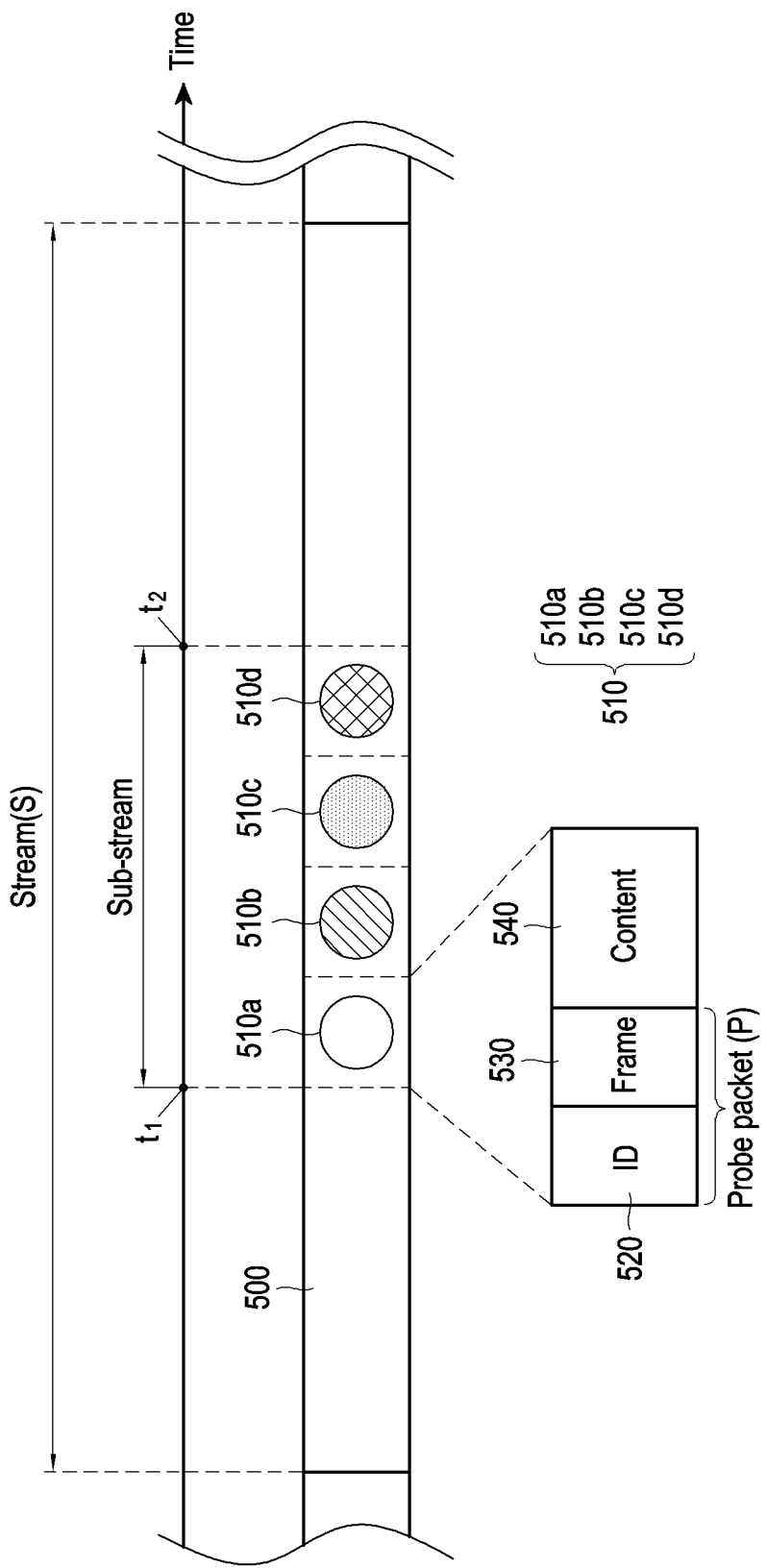
FIG. 5 is a diagram illustrating an example of stream data according to various embodiments.

FIG. 5 is a diagram illustrating an example of stream data according to various embodiments.

Referring to FIG. 4A, the node device 400 according to various embodiments may include an input device 410, an output device 420, a first communication circuit 430, a first processor 440, and a first memory 450 including an encoder 441, a decoder 443, a delay time calculation module 445, and a forwarding module 447, and the control server 110 may include a second communication circuit 480, a second processor 460, and a second memory 470 including a routing module 461. The disclosure is not limited to the above description and/or the illustration therefor, and each of the node device 400 and the control server 110 may be implemented to include more or fewer elements (or devices or electronic components). For example, according to the type (e.g., the transmission server 120 and the client device 200) of the node device 400 as described above, examples of devices included in the node device 400 may be different from each other.

According to various embodiments, the encoder 441, the decoder 443, and modules (e.g., the delay time calculation module 445, the forwarding module 447, and the routing module 461) implemented in the node device 400 and the control server 110 may be implemented as an application, a program, computer code, instructions, routines, processes, software, or firmware, which is executable by the node device 400 (e.g., the first processor 440) and the control server 110 (e.g., the second processor 460), or a combination of at least two of them. For example, when the encoder 441, the decoder 443, and the modules (e.g., the delay time calculation module 445, the forwarding module 447, and the routing module 461) are executed, the processors 440 and 460 may perform operations corresponding to the executed elements. Therefore, hereinafter, the description that a particular module performs the operation may be understood as the processors 440 and 460 performing the operation corresponding to the particular module according to the execution of the particular module. The disclosure is not limited to the above description, and the function of at least a part of the encoder 441, the decoder 443, and the modules (e.g., the delay time calculation module 445, the forwarding module 447, and the routing module 461) may be implemented by separate software. Furthermore, the disclosure is not limited to the above description, and at least a part of the encoder 441, the decoder 443, and the modules (e.g., the delay time calculation module 445, the forwarding module 447, and the routing module 461) may be implemented as hardware type device (e.g., processing circuit).

Hereinafter, an example of elements of the node device 400 according to various embodiments will be described first.

According to various embodiments, the input device 410 may indicate devices for obtaining various information input to the node device 400. For example, as illustrated in FIG. 4A, the input device 410 may include a camera 411 and a microphone 413. However, the disclosure is not limited to the above description and/or the illustration therefor, and devices for obtaining various information as the input device 410 may be further implemented in the node device 400.

According to various embodiments, the output device 420 may indicate devices which provide various types of contents (e.g., visual content, auditory content, and tactile content) which is recognizable by a user (i.e., which is able to stimulate at least one of the user's five senses). For example, as illustrated in FIG. 4A, the output device 420 may include a display 421 and a speaker 423. However, the disclosure is not limited to the above description and/or the illustration therefor, and devices for providing a content as the output device 420 may be further implemented in the node device 400.

According to various embodiments, the first communication circuit 430 may be implemented to support communication with an external device (e.g., another node device 400 and/or the control server 110) in real time. For example, as described later, the first communication circuit 430 may transmit multiple pieces of sub-stream data to an external device in real time, and/or transmit pieces of probe packet data corresponding to the respective pieces of sub-stream data to the external device. The first communication circuit 430 may be implemented similar to the communication module 190 in FIG. 1, and thus duplicative description will be omitted.

According to various embodiments, the first processor 440 may include at least one of an application processor (AP), a central processing unit (CPU), a graphic processing unit (GPU), a display processing unit (DPU), or a neural processing unit (NPU). As described above, according to execution of the encoder 441, the decoder 443, and modules (e.g., the delay time calculation module 445 and the forwarding module 447), the first processor 440 may perform an operation (or provide a function). The operation of the encoder 441, the decoder 443, and modules (e.g., the delay time calculation module 445 and the forwarding module 447) described below may be understood as the operation of the first processor 440, based on execution of the encoder 441, the decoder 443, and the modules. The first processor 440 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to various embodiments, the encoder 441 may be implemented to generate stream data. For example, referring to FIG. 4B, the client device 200 may encode image data and voice data obtained by the input device 410 in real time, based on the encoder 441, thereby generating stream data. The encoding may indicate operations of compiling pieces of data (e.g., image data and voice data) in a type allowing use for communication, transmission, and/or storage. Referring to FIG. 5, the generated stream data 500 may be defined as data generated continuously (or in real time), and for example, may be video streaming data. The encoder 441 may encode image data and voice data, based on various types of codecs, and a more detailed description of a codec-based encoding operation of the encoder 441 will be omitted because it is well-known technique.

According to various embodiments, the forwarding module 447 may perform the operation of partitioning the stream data 500 generated by the encoder 441 into multiple pieces of sub-stream data 510, and generating pieces of probe packet data P corresponding to the respective multiple pieces of sub-stream data 510a, 510b, 510c, and 510d. For example, the forwarding module 447 (e.g., a sub-stream generation module 447a) may, as illustrated in FIG. 5, sequentially partition the stream data 500 generated by the encoder 441 into designated number of pieces (or packets of a designated size (e.g., data rate), which may be referred to as a designated unit)). For example, the forwarding module 447 (e.g., the sub-stream generation module 447a) may partition stream data generated for a designated time period (e.g., a time from t1 to t2) into a designated number of pieces. Some of the stream data 500 having been partitioned into the designated number of pieces may be defined as sub-stream data S. For example, as illustrated in FIG. 5, the forwarding module 447 (e.g., the sub-stream generation module 447a) may partition a sub-stream into four pieces of sub-stream data 510a, 510b, 510c, and 510d according to a designated time period, but the disclosure is not limited to the mentioned number, and various numbers of pieces of sub-stream data may be obtained via partitioning. Another node device (e.g., forwarding module and decoding module of the device) having received the partitioned pieces of sub-stream data may combine the pieces of sub-stream data to convert into one piece of stream data. Referring to FIG. 5, each of the pieces of sub-stream data may include information 520 (e.g., ID) for identification, information 530 on a generation time, and data 540 (e.g., image data) on a part of the stream data 500. The generation time may indicate a time at which a sub-stream is generated in the forwarding module 447. As another example, when a sub-stream is received from another node device by the forwarding module 447, the forwarding module may replicate the received sub-stream to transfer same to another device. Similarly, the replicated sub-stream may also include information 520 (e.g., ID) for identification, information 530 on a generation time, and data 540 (e.g., image data) implemented as parts of the stream data 500. The generation time may indicate a time of generation caused by replication of sub-stream data by the forwarding module 447.

According to various embodiments, the forwarding module 447 (e.g., a probe packet generation module 447b) may generate probe packet data P corresponding to each sub-stream data S according to a designated time period. The period by which the probe packet data P is generated may be longer than is the period by which the sub-stream data S is generated. In an embodiment, the forwarding module 447 (e.g., the probe packet generation module 447b) may generate probe packet data P by obtaining a part of each sub-stream data S. The forwarding module 447 may, while generating sub-stream data so as to transmit same to one node device, obtain a part of the sub-stream data (sub-stream) to generate probe packet data P so as to transfer the probe packet data to another node device. Referring to FIG. 5, the probe packet data P may be partial data of sub-stream data (sub-stream), and may include information for identification of sub-stream data (sub-stream) and information on the generation time. Probe packet data P is partial data of sub-stream data (sub-stream), and thus has size smaller than that of the sub-stream data (sub-stream), and the node device 400 receiving probe packet data P may identify the generation time (i.e., the time of generation in the forwarding module) of particular sub-stream data (sub-stream), based on the probe packet data P. In addition, in an embodiment, the forwarding module 447 (e.g., the probe packet generation module 447b) may also generate probe packet data P by replicating probe packet data P received from another node device 400.

According to various embodiments, the node device 400 (e.g., the first processor 440) may transmit multiple pieces of sub-streams 510a, 510b, 510c, and 510d and/or probe packet data P generated by the forwarding module 447 to an external electronic device (e.g., another node device 400) via the first communication circuit 430. For example, referring to FIG. 4B, when the client device 200 and/or the transmission server 120 (e.g., the first processor 440) is the higher node transmitting sub-stream data, the client device 200 and/or the transmission server 120 (e.g., the first processor 440) may transmit multiple pieces of sub-streams 510a, 510b, 510c, and 510d generated by the forwarding module 447 to another node device 400 (e.g., the transmission server 120 or another client device 200) in real time. The client device 200 and/or the transmission server 120 may periodically transmit probe packet data P to another node device 400 other than the lower node in the transmission path for the multiple sub-streams 510a, 510b, 510c, and 510d. As another example, when the client device 200 and/or the transmission server 120 (e.g., the first processor 440) is the lower node receiving sub-stream data S, the client device 200 and/or the transmission server 120 (e.g., the first processor 440) may transmit probe packet data P generated by the forwarding module 447 to a node device other than the higher node of the reception path of sub-stream data S. An example of transmission operations of sub-stream data S and probe packet data P by the node device 400 will be further described later.

According to various embodiments, the delay time calculation module 445 may calculate a delay time of sub-stream data received from another node device 400. For example, the delay time calculation module 445 may calculate a delay time for each path (e.g., reception path) of particular sub-stream data (sub-stream). For example, when particular sub-stream data (sub-stream) is received from another node device 400, the delay time calculation module 445 may obtain, as the delay time, the difference between the generation time included in the particular sub-stream data (sub-stream) and a time (reception time) at which the particular sub-stream data (sub-stream) is received by the node device 400. As another example, the delay time for each communication path (e.g., reception path) of probe packet data P for particular sub-stream data (sub-stream) from another node device 400 may be calculated. For example, when probe packet data P corresponding to particular sub-stream data (sub-stream) is received from another node device 400, the delay time calculation module 445 may obtain, as the delay time, the difference between the generation time included in the probe packet data P and the reception time of the probe packet data P. The delay time calculation module 445 may identify an average delay time, based on delay times calculated according to a designated period.

According to various embodiments, the node device 400 (e.g., the first processor 440) may transmit, to the control server 110 and via the first communication circuit 430, information on the delay time of particular sub-stream data (sub-stream), which is identified by the delay time calculation module 445. Although described later, the control server 110 may determine a communication path for particular sub-stream data (sub-stream) of each node device 400, based on information on the delay time received from each node device 400.

According to various embodiments, the decoder 443 may be implemented to generate images or other contents to be output via the output device 420. For example, referring to FIG. 4B, the client device 200 may obtain pieces of sub-stream data S generated by the forwarding module 447 in real time, and/or pieces of sub-stream data S via the first communication circuit 430, and encode same, based on the encoder 441 so as to generate an image. The encoder 441 may encode image data and voice data, based on various types of codecs, and more detailed description of codec-based encoding operation of the encoder 441 will be omitted because it is well-known technique. The first processor 440 may output the encoded images via the output device 420. For example, the first processor 440 may display a screen via the display 421, and output sound via the speaker 423.

Hereinafter, an example of elements of the control server 110 according to various embodiments will be described first.

According to various embodiments, the second communication circuit 480 may be implemented to support communication with an external device (e.g., the node device 400) in real time. For example, although described later, the second communication circuit 480 may receive information on the delay time for each communication path of sub-stream data (sub-stream) from the node device 400, and transmit a message for determination of a communication path to the node device 400. The second communication circuit 480 may be implemented similar to the communication module 190 in FIG. 1, and thus duplicative description will be omitted.

According to various embodiments, the second processor 460 may be implemented similar to the first processor 440 of the node device 400 described above, and thus duplicative description will be omitted. The operations of the routing module 461 described below may be understood as the operations of the second processor 460, based on execution of the routing module 461.

According to various embodiments, the routing module 461 (e.g., change gain calculation module 461a) may calculate a parameter value (e.g., change gain value) indicating gain of the particular node device 400, which is obtained by a reduction of the delay time caused by changing to a different communication path from the current communication path of particular sub-stream data (sub-stream). For example, the routing module 461 may, based on a report message M including information on the delay time for each communication path received for particular sub-stream data S from the particular node device 400 via the first communication circuit 430, identify the current delay time of a current communication path (i.e., a different node device 400 transmitting the particular sub-stream data (sub-stream) to the current particular node device 400) of the particular node device 400 for the particular sub-stream data S, and the changed delay time of a different communication path for the particular sub-stream data S. The routing module 461 may obtain the change gain value, based on the current delay time and the changed delay time. The operations of the control server 110 for calculating the change gain value will be described in detail later.

According to various embodiments, the routing module 461 (e.g., a threshold value determination module 461b) may determine a threshold value, based on the types of changed node devices 400. For example, the threshold value determination module 461b may determine a threshold value, based on the type of a first node device 400 transmitting (i.e., corresponding to a communication path) particular sub-stream data (sub-stream) to a particular node device 400, and the type of a second node device 400 not corresponding to the communication path. The threshold value is a value determining whether to change the communication path, and will be described later, but the higher the threshold value, the more difficult it is to change the communication path. For example, between the transmission quality and server cost, when higher priority is configured for transmission quality, the routing module 461 may configure a first threshold value for when the second node device 400 is the client device 200, and the first threshold may be larger than a second threshold value for when the second node device 400 is the transmission server 120. Accordingly, when the type of a changed communication path is based on the P2P scheme, the change may be prevented so as to maintain transmission quality. For example, between transmission quality and the server cost, when higher priority is configured for server cost, the routing module 461 may configure a second threshold value for when the second node device 400 is the transmission server 120, and the second threshold may be larger than a first threshold value for when the second node device 400 is the client device 200. Accordingly, when the type of a changed communication path is based on the server scheme, the level of difficulty of changing the communication path may be increased so as to maintain the communication path based on the P2P scheme, and reduce server cost.

According to various embodiments, the routing module 461 (e.g., a communication path determination module 461c) may determine a communication path of a particular node device 400 for particular sub-stream data (sub-stream), based on a delay ratio and a threshold value. For example, when a calculated delay ratio is larger than a threshold value, the communication path determination module 461c may determine to change a current communication path to a different path. Referring to FIG. 4B, the control server 110 (e.g., the first processor 440) may transmit a message for communication path change to the particular node device 400 and a node device 400 having transmitted particular sub-stream data (sub-stream) to the particular node device 400 according to the determination. An example of the operations of the control server 110 for determining a communication path will be described later.

Hereinafter, an example of the operations of devices (e.g., the client device 200 and the server 100) according to various embodiments will be described.

According to various embodiments, each of node devices may transmit a sub-stream to a lower node device, and transmit probe packet data corresponding to the sub-stream to a different node device other than the higher node device and the lower node device participating in the communication path. Each of the node devices may periodically transmit, to the control server 110, a report message including information on the delay time of the current communication path of a particular sub-stream, and a different communication path other than the current communication path. The control server 110 may determine a communication path of a particular sub-stream received by a particular node device, based on the information on the delay time.

Figure 6:
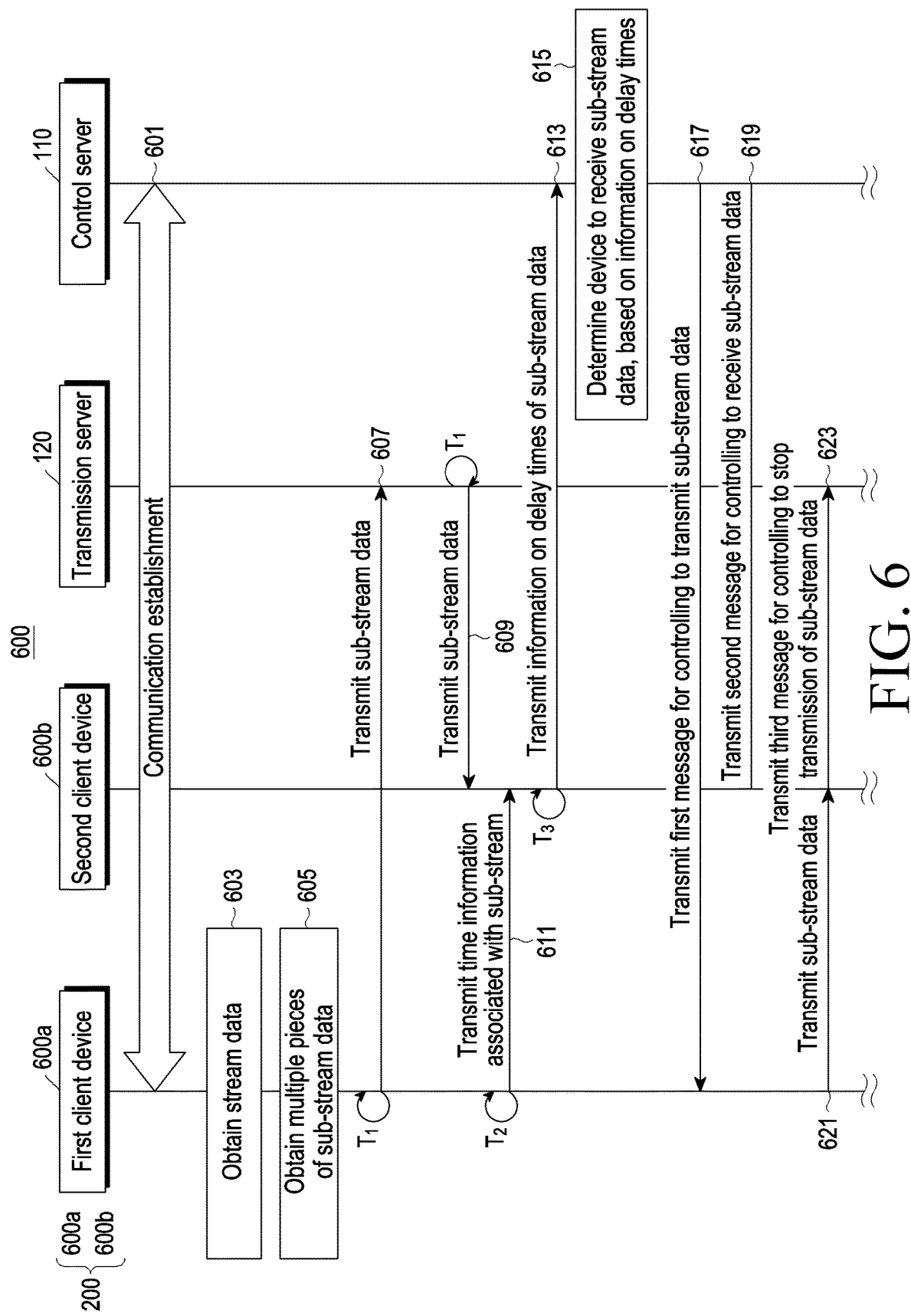
FIG. 6 is a flowchart illustrating an example of operations of devices (e.g., client devices, a transmission server, and a control server) according to various embodiments.

FIG. 6 is a flowchart 600 illustrating an example of operations of devices (e.g., the client devices 200, the transmission server 120, and the control server 110) according to various embodiments. According to various embodiments, the operations illustrated in FIG. 6 may be performed in various orders without being limited to the illustrated order. In addition, according to various embodiments, more operations or one or more fewer operations may be performed compared to the operations illustrated in FIG. 6. Hereinafter, FIG. 6 will be described with reference to FIG. 7 and FIG. 8.

Figure 7A:
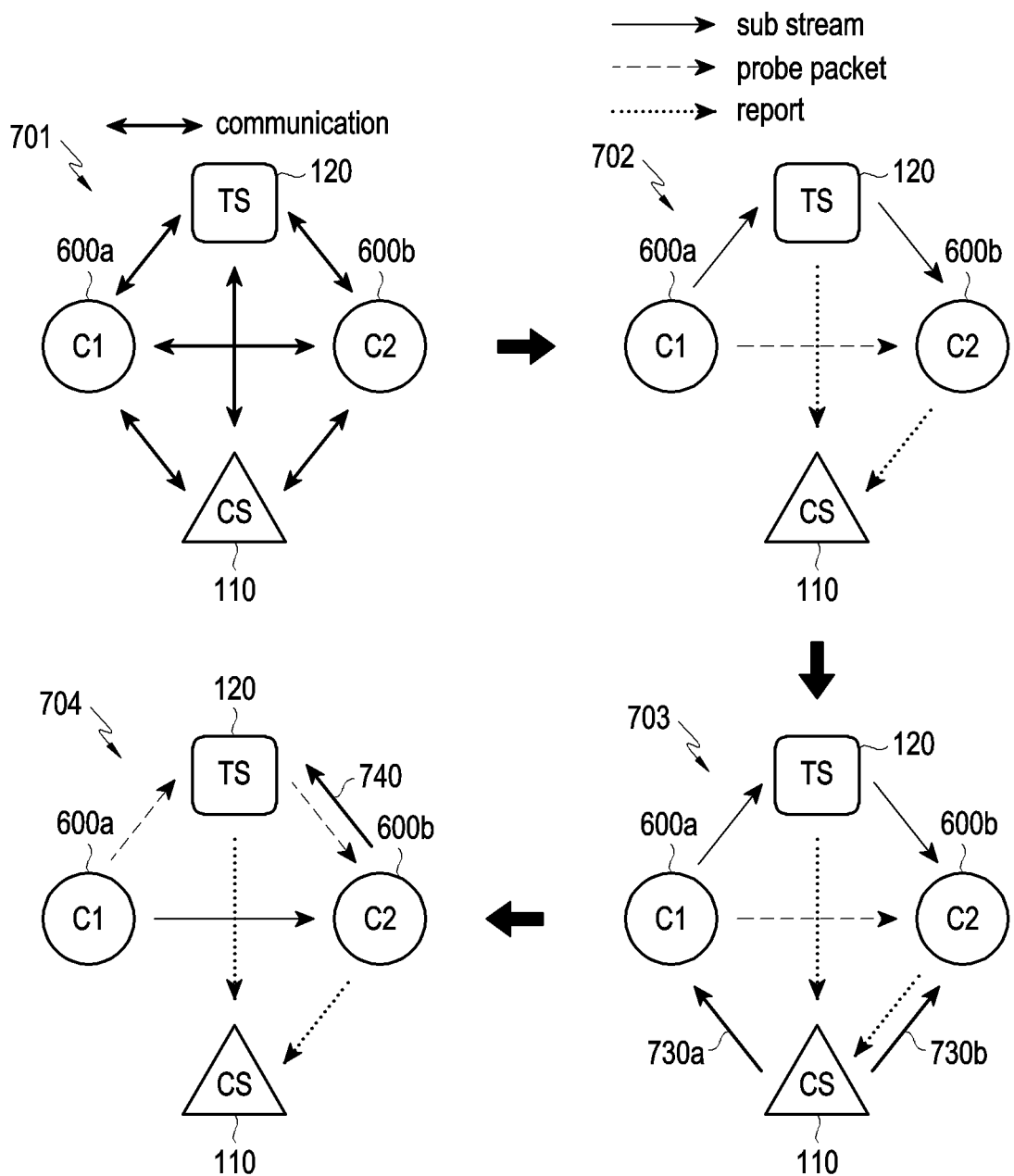
FIG. 7A is a diagram illustrating an example of operations of transmitting and/or receiving data and/or a message by devices (e.g., client devices, such as a first client device and a second client device, a transmission server, and a control server) according to various embodiments.
Figure 7B:
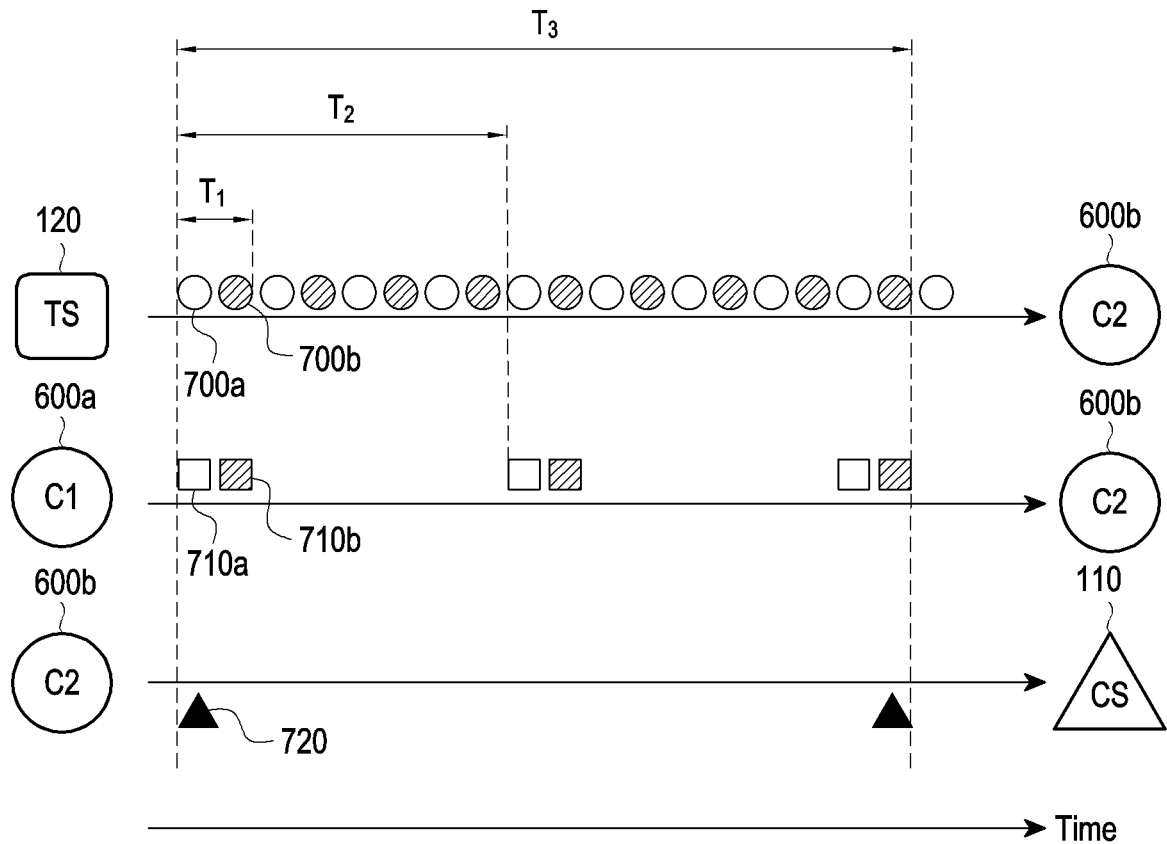
FIG. 7B is a diagram illustrating an example of a sub-stream data transmission operation, a probe packet transmission operation, and a report message transmission operation of a node device according to various embodiments.
Figure 8:
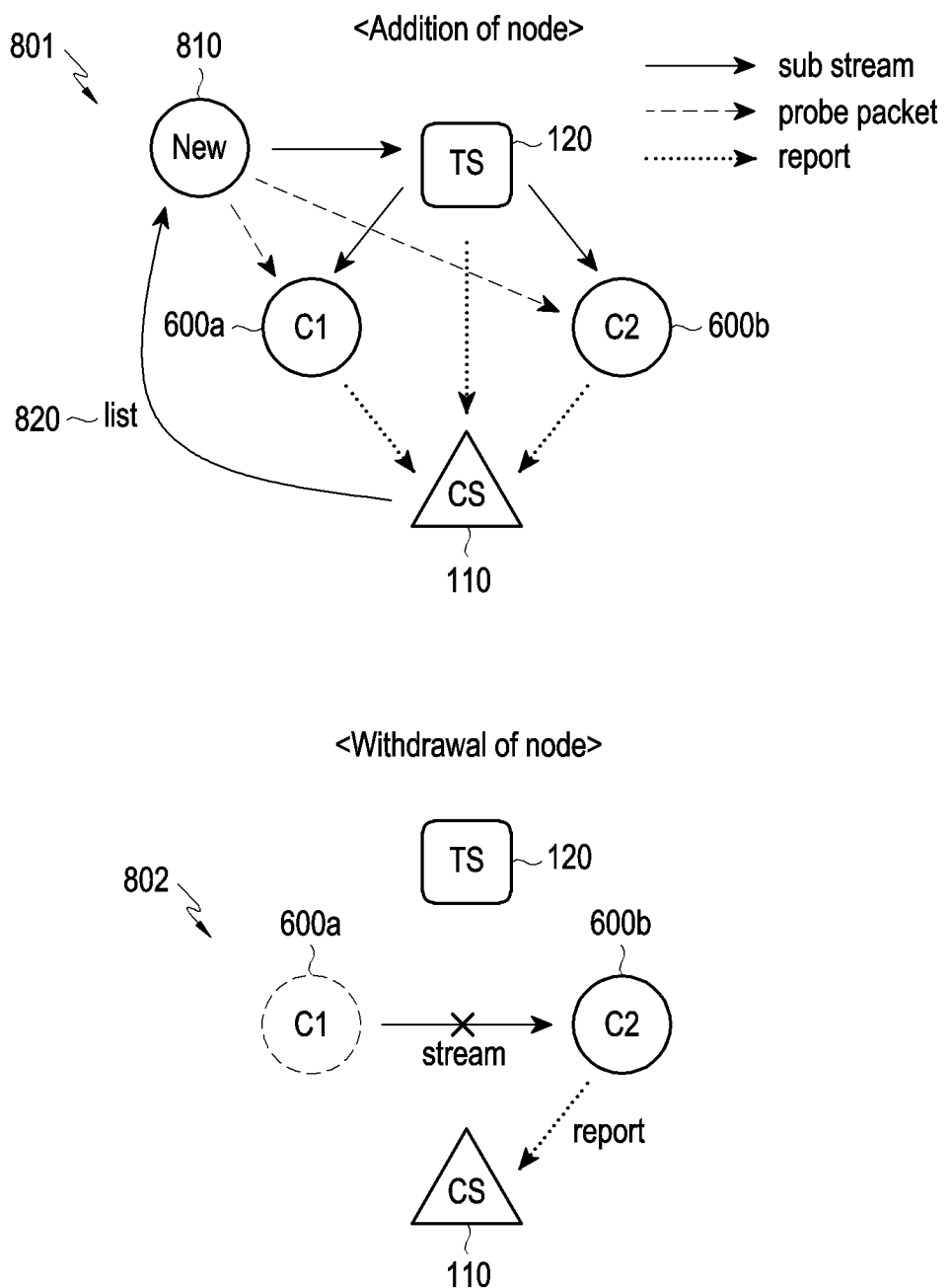
FIG. 8 is a diagram illustrating an example of participation of a new node device and withdrawal of an existing node device according to various embodiments.

FIG. 7A is a diagram illustrating an example of operations of transmitting and/or receiving data and/or a message by devices (e.g., client devices such as first client device 600a, second client device 600b, the transmission server 120, and the control server 110) according to various embodiments. FIG. 7B is a diagram illustrating an example of a sub-stream data transmission operation, a probe packet transmission operation, and a report message transmission operation of a node device according to various embodiments. FIG. 8 is a diagram illustrating an example of participation of a new node device and withdrawal of an existing node device according to various embodiments.

According to various embodiments, electronic devices (e.g., the first client device 600a or C1, the second client device 600b or C2, the transmission server 120 or TS, and the control server 110 and CS) may, in operation 601, perform operations of establishing communication. For example, as indicated by reference numeral 701 in FIG. 7A, the first client device 600a, the second client device 600b, the transmission server 120, and the control server 110 may establish communication with each other. For example, in order to receive a service (e.g., video conference service), the client devices 200 (e.g., the first client device 600a and the second client device 600b) may execute an application (or program) implemented to provide the service, and access the control server 110, based on the execution of the application. Each of the client devices 200 (e.g., the first client device 600a and the second client device 600b) may receive, from the control server 110, list information including a list of node devices (e.g., the first client device 600a, the second client device 600b, and the control server 110). The list information may include identification information for each of the node devices (e.g., the first client device 600a, the second client device 600b, and the control server 110), and information (e.g., IP address or MAC address) for establishment of communication to each of the node devices. After the client devices 200 accesses the control server 110, the client devices 200 and the control server 110 may establish communication, based on the information (e.g., IP address or MAC address) for establishment of communication according to control of the control server 110.

According to various embodiments, referring to reference numeral 801 in FIG. 8, when a new node device 810 accesses the control server 110 (or establish communication for a current service), the control server 110 or CS may transmit list information 820 on the other node devices 120, 600a, and 600b to the corresponding new node device 810. The new node device 810 may transmit multiple pieces of sub-stream data to the transmission server 120, based on the list information 820, and transmit probe packet data to the other node devices 600a and 600b. For example, the first client device 600a may sequentially transmit multiple pieces of sub-stream data 700a and 700b to the transmission server 120 according to a first period T1. Referring to FIG. 7B, the transmission server 120 may sequentially transmit the multiple pieces of sub-stream data 700a and 700b received from the first client device 600a to the second client device 600b according to the first period T1.

According to various embodiments, the first client device 600a or C1 may obtain stream data in operation 603, and obtain multiple pieces of sub-stream data in operation 605. For example, the first client device 600a (e.g., its encoder and forwarding module) may generate stream data, based on image data and/or voice data obtained using input devices, and partition the stream data into a designated number of pieces to generate multiple pieces of sub-stream data. The operation of the encoder and the forwarding module may be performed as described above with reference to FIG. 4 and FIG. 5, and thus duplicative description will be omitted.

According to various embodiments, the first client device 600a or C1 may, in operation 607, sequentially transmit the multiple pieces of sub-stream data to the transmission server 120. The transmission server 120 may, in operation 609, sequentially transmit the received multiple pieces of sub-stream data to the second client device 600b. For example, referring to reference numeral 702 in FIG. 7A, the client devices 200 may be controlled by a control of the control server 110, to initially transmit multiple pieces of sub-stream data to other client devices 200 via the transmission server 120. That is, the communication path of each of the client devices 200 may be initially a communication path based on the server scheme. For example, the control server 110 may transmit, to each of the client devices 200, a message indicating the transmission server 120 as the lower node to allow transmission of multiple pieces of sub-stream data to the transmission server 120, and transmit, to the transmission server 120, a message indicating the client devices 200 as the lower node to allow transmission of multiple pieces of sub-stream data to the client devices 200. Therefore, the first client device 600a may sequentially transmit multiple pieces of sub-stream data to the transmission server 120 so as to transfer stream data to a different node device (e.g., the second client device 600b) as illustrated in FIG. 8.

According to various embodiments, the first client device 600a or C1 may, in operation 611, transmit time information associated with each of multiple sub-streams according to a designated period T2. For example, each node device may transmit probe packet data of each sub-stream to a different node device without passing through a communication path (e.g., a higher node or lower node). As described above with reference to FIG. 5, the probe packet data may include information for identification of a sub-stream and information on a generation time of the sub-stream, and thus a more detailed description will be omitted. For example, referring to reference numeral 702 in FIG. 7a, the first client device 600a may transmit probe packet data of each of multiple sub-streams to the second client device 600b, which is a node device different from the transmission server 120 that is the lower node. Referring to FIG. 7B, the first client device 600a may transmit pieces of probe packet data 710a and 710b corresponding to the multiple pieces of sub-stream data 700a and 700b to the second client device 600b according to the second period T2 that is longer than the first period T1 by which the multiple pieces of sub-stream data 700a and 700b are transmitted. The transmission period T2 of the probe packet data 710a and 710b may be controlled by the control server 110, and will be described later with reference to FIG. 15. Furthermore, although not illustrated, the second client device 600b may replicate probe packet data received from the first client device 600a, and transmit the probe packet data to a different node device without passing through a communication path (i.e., a higher node or lower node). Alternatively, the disclosure is not limited to the above description, and the second client device 600b may also perform operations of transferring probe packet data without replicating same.

According to various embodiments, the second client device 600b or C2 may, in operation 613, transmit information on delay times of the sub-stream data. For example, the second client device 600b may calculate delay times associated with reception paths of respective multiple sub-streams, and may transmit a report message 720 including information on the calculated delay times to the control server 110 according to a third period T3 as illustrated in FIG. 7B. The second client device 600b may receive multiple pieces of sub-stream data from the transmission server 120 through a first reception path, and receive probe packet data of each of the multiple pieces of sub-stream data from the first client device 600a through a second reception path. The second client device 600b may identify the delay time for each of the reception paths by calculating the difference between the generation time of sub-stream data and the reception time of the sub-stream data, which are received from a corresponding higher node (e.g., the first client device 600*a* and the transmission server 120) through a corresponding reception path, an example of which is as shown in [Table 1] below.

TABLE 1

| Particular sub-stream data | Higher node C1 | Higher node TS |
| --- | --- | --- |
| Generation time | 0 sec | 0.1 sec |
| Reception time | 0.018 sec | 0.122 sec |
| Delay time | 18 ms | 22 ms |

The second client device 600*b* or C2 may identify an average delay time of the delay times for each of the reception paths (e.g., the reception path for the first client device 600*a* and the reception path for the transmission server 120) according to the third period, and may transmit, to the transmission server 120, the report message 720 including information on the average delay time for each of the reception paths. According to various embodiments, the control server 110 may, in operation 615, determine the device to receive the sub-stream, based on the information on the delay times. For example, the control server 110 may determine whether to change the reception path for particular sub-stream data received by a particular node device, based on information included in the report message 720 according to the period T3 by which the report message 720 is received. The control server 110 may select a particular piece of sub-stream, the reception path for which is to be changed, among multiple pieces of sub-stream data received by a particular node device according to a period (e.g., the period T3 by which the report message 720 is received), and this will be described later. For example, based on a first delay time of a first reception path (or higher node transmitting particular sub-stream data) for particular sub-stream data received by a particular node device, and a second delay time of a second reception path (or higher node transmitting probe packet data corresponding to the particular sub-stream data) for probe packet data of the particular sub-stream data, the control server 110 may obtain a value (e.g., change gain) indicating gain in terms of delay time when the first reception path is changed to the second reception path. For example, the change gain value indicates a ratio of the first delay time of the first reception path compared to the second delay time of the second reception time, and thus the higher the change gain value the larger the gain in terms of delay time, which is obtained by a change to the second reception path. However, the change gain value is not limited the above description, and may be implemented to be opposite to the description, i.e. the change gain value may be a ratio of the second delay time of the second reception time and the first delay time of the first reception path. When the obtained value (e.g., change gain) is equal to or greater than a threshold value, the control server 110 may determine to change the current reception path for particular sub-stream data to a different reception path, or when the obtained value (e.g., change gain) is smaller than the threshold value, may maintain the current reception path for particular sub-stream data. The threshold value may be determined based on the type of the higher node (e.g., the transmission server 120 for the second client device 600*b*) of the current reception path, and the type of the higher node (e.g., the first client device 600*a* for the second client device 600*b*) of the different reception path, and thus will be described later.

In an embodiment, the control server 110 or CS may calculate the delay gain as shown in [Equation 1] below. For example, the control server 110 may identify, from the report message 720 received from the first client device 600*a*, the first delay time (e.g., 18 ms in [Table 1]) associated with the transmission server 120 corresponding to a reception path for sub-stream data, and the second delay time (e.g., 22 ms in [Table 1]) of sub-stream data associated with the first client device 600*a* corresponding to a reception path for probe packet data. Accordingly, the control server 110 may obtain the change gain value of about 0.18 as a delay gain. It may be understood that the higher the change gain value the higher the gain in terms of quality transmission when the reception path is changed.

$$\text{Change gain} = \frac{\text{Delay time of Current reception path} - \text{Delay time of different reception path}}{\text{Delay time of Current reception path}} \quad \text{[Equation 1]}$$

In addition, in an embodiment, the control server 110 or CS may calculate a delay gain as shown in [Equation 2] below. For example, when the first delay time of sub-stream data associated with the transmission server 120 corresponding to the reception path for the sub-stream data is 18 ms as shown in [Table 1], and the second delay time of sub-stream data associated with the first client device 600*a* corresponding to the reception path for probe packet data is 22 ms as shown in [Table 1], the control server 110 may obtain a change gain value of about 1.2 as a change gain. It may be understood that the higher the change gain value the higher the gain in terms of quality transmission when the reception path is changed.

$$\text{Change gain} = \frac{\text{Delay time of Current reception path}}{\text{Delay time of different reception path}} \quad \text{[Equation 2]}$$

The disclosure is not limited to the above equations, and the control server 110 or CS may also perform the operation of obtaining a value indicating gain obtained by a change of a reception path by using various equations, based on a comparison between the delay time of a reception path for particular sub-stream data and the delay time of a reception path of probe packet data of the particular sub-stream data.

According to various embodiments, when there are multiple reception paths for probe packet data of particular sub-stream data, the control server 110 or CS may identify a particular reception path (or particular higher node) to be subject to change of a reception path for the particular sub-stream data, based on the change gain values of the reception paths described above. For example, the control server 110 may identify change gain values, based on the delay time of the reception path of particular sub-stream data, and delay times of reception paths for probe packet data by using the equations described above. The control server 110 may perform operations (e.g., operation 615) of identifying the greatest change gain value in the change gain values, identifying a reception path having the corresponding change gain value as a particular reception path to be subject to the change, and determining whether to change the reception path for current particular sub-stream data to the identified particular reception path.

According to various embodiments, the control server 110 or CS may, transmit, to the first client device 600*a*, a first message for controlling to transmit a sub-stream in operation 617, and may transmit, to the second client device 600*b*, a second message for controlling to receive a sub-stream in operation 619. For example, as indicated by reference numeral 703 in FIG. 7A, when the value (e.g., change gain) indicating gain obtained by change of the reception path is greater than the threshold value, the control server 110 may transmit messages for changing the reception path for particular sub-stream data of a particular node device (e.g., the second client device 600*b*) to the particular node device and a higher node (e.g., the first client device 600*a* as opposed to the transmission server 120) of a different reception path. For example, as indicated by reference numeral 703 in FIG. 7A, the control server 110 may transmit, to the first client device 600a, a first message 730a for causing to transmit particular sub-stream data to the second client device 600b. In addition, the control server 110 may transmit, to the second client device 600b, a second message 730b for notifying that particular sub-stream data is to be received from the first client device 600a.

According to various embodiments, the first client device 600a or C1 may, in operation 621, sequentially transmit multiple pieces of sub-stream data to the second client device 600b. For example, from the time point at which the first message is received, the first client device 600a may periodically transmit particular sub-stream data to the second client device 600b.

According to various embodiments, the second client device 600b or C2 may, in operation 623, transmit, to the transmission server 120, a third message for controlling to stop sub-stream transmission. For example, as indicated by reference numeral 704 in FIG. 7A, after the particular sub-stream data is received from the first client device 600a, the second client device 600b may transmit, to the transmission server 120, a third message 740 causing to stop transmission of the particular sub-stream data, based on reception of the second message. The control server 110 may not perform the operation of stopping transmission of particular sub-stream, based on reception of the third message 740. When the second message 730b is not received, the second client device 600b may transmit, to the first client device 600a, a message causing the transmission of the particular sub-stream data to be stopped.

The control server 110 or CS has been described to change a reception path for particular sub-stream data of the second client device 600b or C2. However, the disclosure is not limited thereto, and when the change gain value is smaller than the threshold value, the control server 110 may not perform operations of transmitting the above messages so as to maintain the reception path of the second client device 600b.

In addition, according to various embodiments, the control server 110 or CS may perform the operation of managing a node device in which a problem has occurred, as well as changing the reception path. For example, as indicated by reference numeral 802 in FIG. 8, when sub-stream data is not received for a designated time period from the first client device 600a, which is the higher node of the second client device 600b, the second client device 600b may transmit a message notifying of the non-reception to the control server 110. The control server 110 may perform, based on the reception of the message, operations of withdrawing the first client device 600a from node devices, and stopping providing the service, and/or receiving sub-stream data from the first client device 600a and transferring same to the second client device 600b.

Hereinafter, an example of the operations of the control server 110 according to various embodiments will be described. The description for flowchart 600 described above may be employed for the operation of the control server 110 described below.

According to various embodiments, based on information on the delay time for each reception path associated with particular sub-stream data received by a particular node device, which is periodically received from the particular node device, the control server 110 (hereinafter, server) may determine the reception path for the particular sub-stream data of the particular node device.

Figure 9:
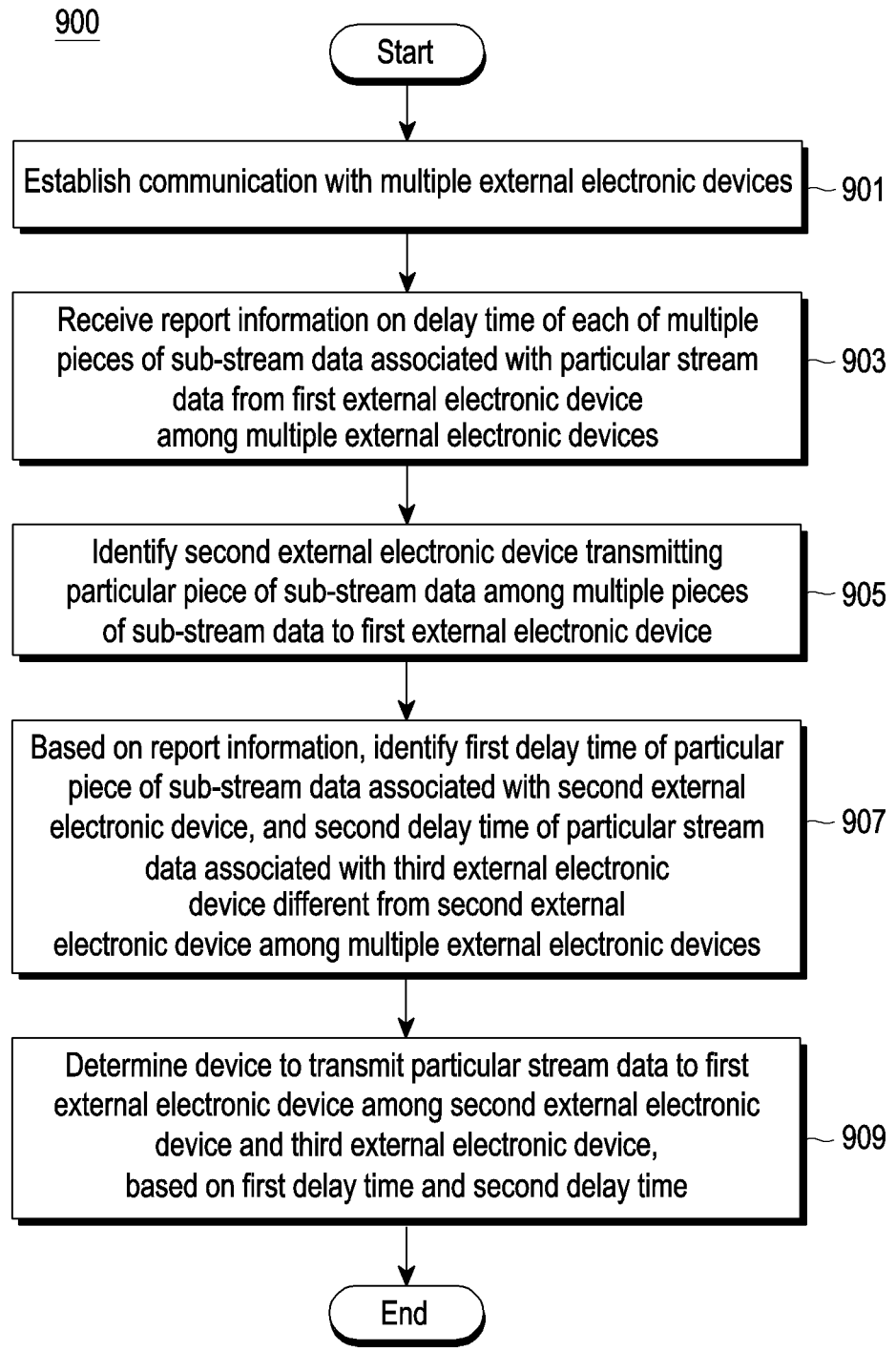
FIG. 9 is a flowchart illustrating an example of operations of devices (e.g., client devices, a transmission server, and a control server) according to various embodiments.

FIG. 9 is a flowchart 900 illustrating an example of operations of devices (e.g., the client devices 200, the transmission server 120, and the control server 110) according to various embodiments. According to various embodiments, the operations illustrated in FIG. 9 may be performed in various orders without being limited to the illustrated order. In addition, according to various embodiments, more operations or one or more fewer operations may be performed compared to the operations illustrated in FIG. 9.

According to various embodiments, the server 100 (e.g., the control server 110 or CS) may, in operation 901, establish communication with multiple external electronic devices. For example, the server may establish communication with multiple node devices (e.g., the client device 200 and the transmission server 120). The server may transmit list information on the multiple node devices connected thereto by communication to each of the multiple node devices. The list information may include identification information on a node device and information (e.g., IP/MAC address) for establishment of communication as described above.

According to various embodiments, the server 100 (e.g., the control server 110 or CS) may, in operation 903, receive report information on the delay time of each of multiple pieces of sub-stream data associated with particular stream data from a first external electronic device in the multiple external electronic devices. For example, as described with reference to FIG. 6 to FIG. 8, the server may receive, from each of the multiple node devices and according to the designated period T3, a report message including information on the delay time for each reception path (e.g., the reception path of the sub-stream data and a reception path of probe packet data corresponding to the sub-stream) associated with a sub-stream received by a corresponding node device. For example, referring to [Table 2] below, a report message received from the second client device 600b may include the delay time for each reception path (e.g., the transmission server 120 and the first client device 600a which are higher nodes) associated with a first sub-stream received by the second client device 600b, and the delay time for each reception path (e.g., the transmission server 120 and the first client device 600a which are higher nodes) associated with a second sub-stream. The disclosure is not limited to the description shown in [Table 2], and more higher modes for the second client device 600b may be implemented.

TABLE 2

|  | First sub-stream Average delay time | Second sub-stream Average delay time |
|---|---|---|
| Higher node TS | 22 ms | 23 ms |
| Higher node C1 | 18 ms | 17 ms |

According to various embodiments, the server 100 (e.g., the control server 110 or CS) may, in operation 905, identify a second external electronic device transmitting a particular piece of sub-stream data of the multiple pieces of sub-stream data to the first external electronic device. For example, the server may identify a higher node (e.g., the transmission server 120) of the second client device 600b for a particular piece of sub-stream data (e.g., first piece of sub-stream data) of the multiple pieces of sub-stream data (e.g., the first piece of sub-stream data and a second piece of sub-stream data) being received by a particular node device (e.g., the second client device 600b). For example, the server may identify the higher node (cur_upstream) as a particular node (e.g., the first client device 600a) for the particular sub-stream, based on execution of executable code (O1) as shown in [Table 3]. The code (O1) in [Table 3] is pseudo code, and code for performing the function of the pseudo code in [Table 3] may be implemented based on various types of coding languages.

TABLE 3

Higher node identification pseudo code (O1)

cur_upstream(node, substream):return (higher node transmitting <substream> to <node>)

According to various embodiments, the server 100 (e.g., the control server 110 or CS) may, in operation 907, based on the report information, identify a first delay time of a particular piece of sub-stream data associated with the second external electronic device, and a second delay time of the particular piece of sub-stream data associated with a third external electronic device different from the second external electronic device in the multiple external electronic devices. For example, referring to [Table 2] described above, the server may identify 22 ms, which is the delay time of a higher node (e.g., the transmission server 120) of a reception path for a particular piece of sub-stream data (e.g., the first piece of sub-stream data) of the first client device 600a. For example, the server may execute executable code (O2) as shown in [Table 4] to identify the delay time (cur_latency) of the current reception path for the particular piece of sub-stream data. The code (O2) in [Table 4] is pseudo code, and codes for performing the function of the pseudo code in [Table 4] may be implemented based on various types of coding languages.

TABLE 4

Higher node delay time identification pseudo code (O2)

cur_latency(node, substream):return (average transmission delay of <substream> measured by <node>)

In addition, for example, referring to [Table 2] described above, the control server 110 or CS may identify 18 ms, which is the delay time of a higher node (e.g., the client device 600a) of probe packet data of a particular piece of sub-stream data (e.g., the first piece of sub-stream data) of the first client device 600a. For example, the server may execute executable code (O3) as shown in [Table 5] to identify the delay time (probe_latency) of the higher node of probe packet data of the particular piece of sub-stream data. The code (O3) in [Table 5] is pseudo code, and code for performing the function of the pseudo code in [Table 5] may be implemented based on various types of coding languages.

TABLE 5

Higher node delay time identification pseudo code (O3)

probe_latency(node, substream, upstream-node):return (average delay time of packet belonging to <substeam> among probe packets received by <node> from <upstream-node>)

When there are multiple node devices (i.e., multiple reception paths) as higher nodes associated with particular sub-stream data of a particular node, the control server 110 or CS may identify a particular one node in the multiple node devices, and the delay time of the particular one node. For example, reception paths for the first piece of sub-stream data of the second client device 600b may include a reception path receiving the first piece of sub-stream data from the transmission server 120, and a reception path receiving probe packet data of the first piece of sub-stream data from the first client device 600a. As described with reference to [Table 2], the report may include information on the delay time for each of multiple reception paths (or multiple higher nodes) for the first piece of sub-stream data. The server may identify a node (e.g., the first client device 600a) having the smallest delay time in the multiple higher nodes, and the delay time (e.g., 18 ms) of the corresponding node. For example, referring to [Table 6], the server may identify a minimum delay time (min_probe_latency) (e.g., 18 ms) of a particular sub-stream, based on execution of code (O4) for identification of the smallest delay time of the particular sub-stream, and identify the higher node (best_upstream) (e.g., the first client device 600a) having the corresponding minimum delay time (min_probe_latency), based on execution of a pseudo code (O5) for identification of the node having the smallest delay time among multiple higher nodes for the particular sub-stream. The code (O4 and O5) in [Table 6] is pseudo code, and code for performing the functions of the pseudo code in [Table 6] may be implemented based on various types of coding languages.

TABLE 6

Pseudo code (O4) for identification of smallest delay time for particular sub-stream min_probe_latency (node, substream): return (minimum value of probe_latency(<node>, <substream>, <upstream-node>) for all <upstream-node>)
Pseudo code (O5) for identification of node having smallest delay time among multiple higher nodes for particular sub-stream
best_upstream(node, substeam):return (<upstream-node> having minimum probe_latency(<node>, <substream>, <upstream-node>)

According to various embodiments, the server 100 (e.g., the control server 110 or CS) may, in operation 909, determine whether the second external electronic device and the third external electronic device should transmit the particular stream data to the first external electronic device, based on the first delay time and the second delay time. For example, as described with reference to [Equation 1 and Equation 2], the server may calculate a change gain value, based on the delay time of the current reception path and the delay time of a different reception path, and may determine a reception path for particular sub-stream data, based on the comparison between the calculated change gain value and a threshold value. The operation of calculating the threshold value will be further described later with reference to FIG. 10. Operation 909 of the server may be performed as operation 615 of the server described above, and thus duplicative description will be omitted.

Hereinafter, an example of operations of the control server 110 or CS according to various embodiments will be described. The description for flowchart 600 described above and flowchart 900 may be employed for operations of the control server 110 described below.

According to various embodiments, the control server 110 (hereinafter, server) may determine a reception path for particular sub-stream data, based on a change gain value for the particular sub-stream data of a particular node, and a threshold value. The server may determine the threshold value, based on the type of the higher node of the current reception path, and the type of the higher node of a reception path subjected to change.

Figure 10:
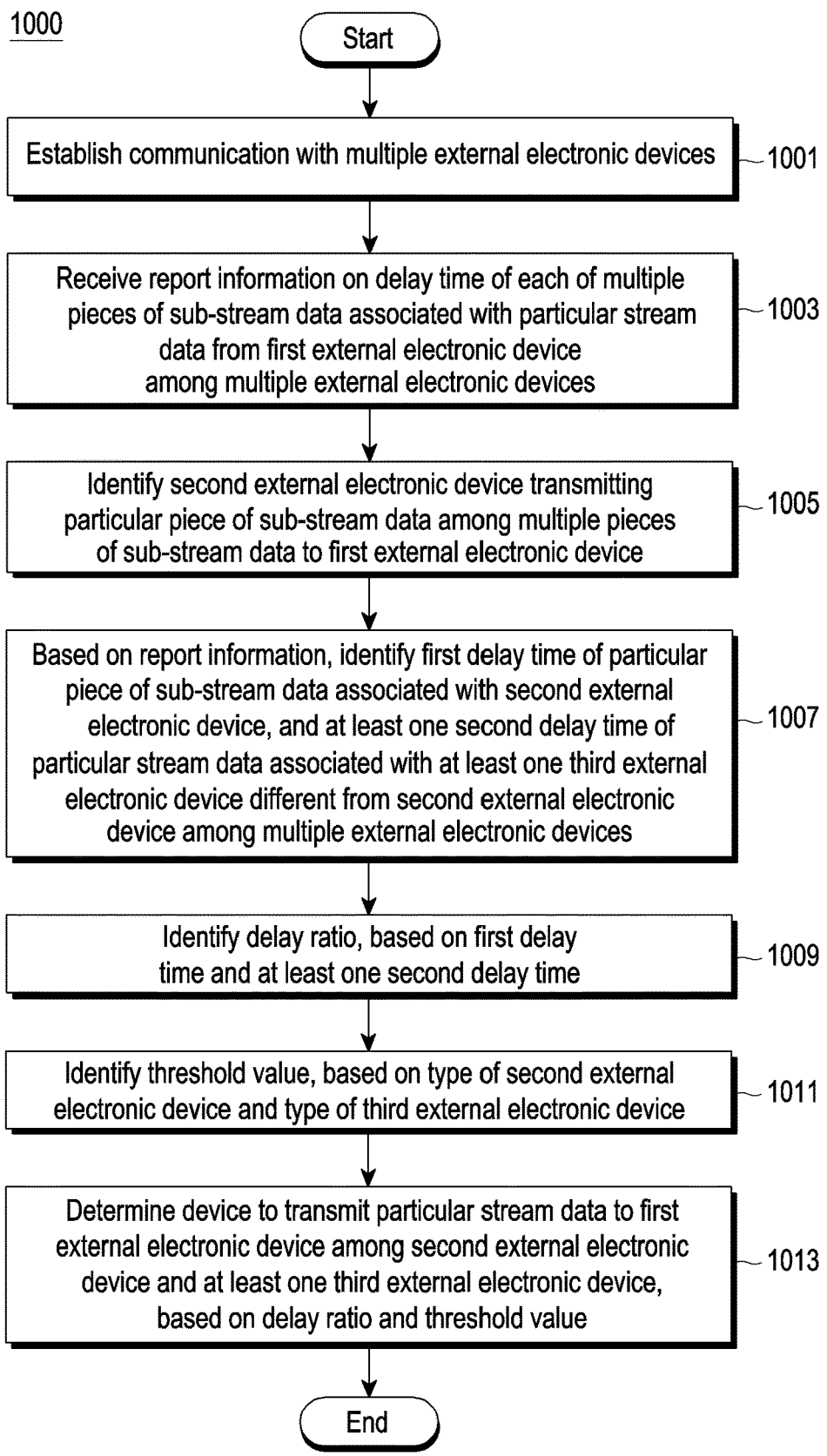
FIG. 10 is a flowchart illustrating an example of operations of a control server according to various embodiments.

FIG. 10 is a flowchart 1000 illustrating an example of operations of the control server 110 according to various embodiments. According to various embodiments, the operations illustrated in FIG. 10 may be performed in various orders without being limited to the illustrated order. In addition, according to various embodiments, more operations or one or more fewer operations may be performed compared to the operations illustrated in FIG. 10.

According to various embodiments, the server 100 (e.g., the control server 110) may, in operation 1001, establish communication with multiple external electronic devices. According to various embodiments, the server (e.g., the control server 110) may, in operation 1003, receive report information on a delay time of each of multiple pieces of sub-stream data associated with particular stream data from a first external electronic device in the multiple external electronic devices. For example, as described above with reference to FIG. 6 to FIG. 8, the server 100 may establish communication with multiple node devices, and receive, according to the designated period T3 and from each of multiple node devices, a report message including information on the delay time for each reception path associated with a sub-stream received by a corresponding node device. Operation 1001 and operation 1003 of the server 100 may be performed as operation 901 and operation 903 of the server 100 described above, and thus duplicative description will be omitted.

According to various embodiments, the server 100 (e.g., the control server 110 or CS) may, in operation 1005, identify a second external electronic device transmitting a particular piece of sub-stream data in the multiple pieces of sub-stream data to the first external electronic device, and, in operation 1007, based on the report information, identify a first delay time of the particular piece of sub-stream data associated with the second external electronic device, and at least one second delay time of the particular stream data associated with third external electronic device different from the second external electronic device in the the multiple external electronic devices. For example, referring to [Table 2] described above, the server 100 may identify 22 ms, which is the delay time of the higher node (e.g., the transmission server 120) of a reception path for a particular piece of sub-stream data (e.g., the first piece of sub-stream data) of the first client device 600a, and identify 18 ms, which is a delay time of a higher node (e.g., the client device 600a) of a reception path for probe packet data of the particular piece of sub-stream data (e.g., the first piece of sub-stream data) of the first client device 600a. Operation 1005 and operation 1007 of the server 100 may be performed as operation 905 and operation 907 of the server 100 described above, and thus duplicative description will be omitted.

According to various embodiments, the server 100 (e.g., the control server 110) may, in operation 1009, identify a change gain, based on the first delay time and the at least one second delay time. For example, as shown in [Equation 1 and Equation 2] described above, the server 100 may calculate the change gain, based on the delay time (e.g., 22 ms) of the reception path (e.g., the transmission server 120) for a particular piece of sub-stream data of the first client device 600a, and the delay time (e.g., 18 ms) of the reception path (e.g., the first client device 600a) for probe packet data.

According to various embodiments, the server 100 (e.g., the control server 110) may, in operation 1011, identify a threshold value, based on the type of the second external electronic device and the type of the third external electronic device. For example, the server 100 may calculate a comparison threshold value (mig_thrshold) to be compared with the above calculated change gain value, based on a preconfigured threshold value (e.g., base_mig_threshold) and a correction value (e.g., cost_bias) for correction of the threshold value. The correction value (e.g., cost_bias) may indicate a preference level for a communication path based on the P2P scheme. The server 100 may perform, as at least part of the operations of calculating the comparison threshold value (mig_thrshold), a calculation operation of not reflecting or reflecting a correction value (e.g., cost_bias) to the pre-configured threshold value (e.g., base_mig_threshold), based on a calculation scheme corresponding to a first type of a higher node of a reception path of the sub-stream data, and a second type of a higher node of a reception path of the probe packet data. For example, referring to pseudo code (O6) for calculation of the comparison threshold value as shown in [Table 7] below, when the first type is a server and the second type is the client device 200 (or a communication path based on the server scheme is changed to a communication path based on the P2P scheme), the server 100 may obtain the comparison threshold value by subtracting the correction value from the pre-configured value. When the first type is the client device 200 and the second type is a server (or a communication path based on the P2P scheme is changed to a communication path based on the server scheme), the server may obtain the comparison threshold value by adding the correction value to the pre-configured value. When the first type and the second type are the same, the server may obtain the pre-configured value as the comparison threshold value without change.

TABLE 7

Pseudo code (O6) for calculation of comparison threshold value mig_threhold(from, to): If <from> is transmission server, <to> is client:
return <base_mig_threshold> − <cost_bias>
Else if <from> is client, <to> is transmission server:
return <base_mig_threshold> + <cost_bias>
Else:
return <base_mig_threshold>

Accordingly, as the correction value (e.g., cost_bias) decreases (e.g., close to 0), the threshold value is configured to be substantially the same regardless of the types of higher nodes. However, as the correction value (e.g., cost_bias) increases, the comparison threshold value for changing from the communication path based on the server scheme to the communication path based on the P2P scheme may be configured to be smaller, and the comparison threshold value for change from the communication path based on the P2P scheme to the communication path based on the server scheme may be configured to be larger. According to various embodiments, the magnitude of the correction value (e.g., cost_bias) may be inversely proportional to transmission quality, and may be proportional to an amount of reduction of server cost. For example, when reduction of server cost matters more, the control server 110 may provide the correction value to have a large magnitude. The control server 110 may identify a parameter value associated with server cost, and when the priority of reduction of server cost is higher than the priority of the transmission quality, based on the identified parameter value, may configure the correction value to have large magnitude. Accordingly, as described above, the comparison threshold value for changing from the communication path based on the P2P scheme to the communication path based on the server scheme may be configured to be smaller, and the comparison threshold value for changing from a communication path based on the server scheme to a communication path based on the P2P scheme may be configured to be larger. In addition, for example, the server may configure the correction value to have small magnitude when transmission quality matters more when the service is provided. The control server 110 may identify a parameter value associated with transmission quality, and when the priority of transmission quality is higher than the priority of the reduction of server cost, based on the identified parameter value, may configure the correction value to have small magnitude. Accordingly, the comparison threshold value for changing from a communication path based on the P2P scheme to the communication path based on the server scheme may be configured to be larger, and the comparison threshold value for changing from the communication path based on the server scheme to the communication path based on the P2P scheme may be configured to be smaller.

As a specific example, the correction value (e.g., cost_bias) has been described to indicate a preference level for the communication path based on the P2P scheme. However, when the correction value (e.g., cost_bias) is implemented to indicate a preference level for the communication path based on the server scheme, on the contrary, the server may perform an operation of, when the communication path based on the server scheme is changed into the communication path based on the P2P scheme, obtaining the comparison threshold value by adding the correction value to a pre-configured value, and when the communication path based on the P2P scheme is changed into the communication path based on the server scheme, obtaining the comparison threshold value by subtracting the correction value from the pre-configured value.

According to various embodiments, the server 100 (e.g., the control server 110) may, in operation 1013, determine whether the second external electronic device or the third external electronic device is to transmit the particular stream data to the first external electronic device, based on the change gain value and the threshold value. For example, when the change gain (base_gain) calculated on particular sub-stream data of the first client device 600a is greater than the comparison threshold value (mig_threshold), the server 100 may determine to change the device transmitting the particular sub-stream data (e.g., first sub-stream data) to the first client device 600a from the higher node (e.g., the transmission server 120) of the current reception path to a higher node (e.g., the second client device 600b) of a different reception path. In addition, for example, when the change gain (base_gain) calculated on particular sub-stream data of the first client device 600a is smaller than the comparison threshold value (mig_threshold), the server may maintain the current transmission path (or maintain the device transmitting the particular sub-stream data (e.g., first sub-stream data) to the first client device 600a to be the higher node (e.g., the transmission server 120) of the current reception path).

For example, referring to [Table 8] below, the control server 110 may identify a determination value (max_node_substrsam_gain) indicating change or non-change, and indicating the difference between the change gain (base_gain) and the threshold value (mig_threshold), based on execution of pseudo code (O7) for calculation of the value indicating change or non-change. When the determination value (max_node_substrsam_gain) is greater than 0, the server may determine to change the reception path, and when the determination value (max_node_substrsam_gain) is smaller than 0, the server may determine to maintain the reception path.

TABLE 8

Pseudo code (O7) for calculation of value indicating change or non-change

```
max_node_substream_gain(node, substream):base_gain = (cur_latency(<node>,
<substream>) – min_probe_latency(<node>, <substream>))/ cur_latency(<node>,
<substream>)
from = cur_upstream(<node>, <substream>)
to = best_upstream(<node>, <substream>)
threshold = mig_threshold(<from>, <to>)
return (<base_gain> – <threshold>)
```

The control server 110 may determine whether to change the reception path for a piece of sub-stream data in multiple pieces of sub-stream data according to a period for reception of a report message. For example, as part of the operation of identifying the determination value (max_node_substrsam_gain), based on the comparison threshold value and the change gain for a first piece of sub-stream data described above, the server 100 may identify a determination value, based on the change gain value and the comparison threshold value of each of multiple pieces of sub-stream data according to a period. The server 100 may identify the highest determination value (e.g., max_node_gain) in the determination values of multiple pieces of sub-stream data, based on execution of a pseudo code (O8) in [Table 9]. The server 100 may identify a particular piece of sub-stream data of the identified highest determination value (e.g., max_node_gain), and determine whether to change the reception path of the particular piece of sub-stream data, based on the determination value of the particular piece of sub-stream data. Accordingly, the server 100 may perform the operation for changing the reception path of the first piece of sub-stream data at a current period, but may perform the operation for changing a reception path of a different piece of sub-stream data other than the first piece of sub-stream data at a next period. The reception path of a particular piece of sub-stream data in multiple pieces of sub-stream data is changed, so that burden of changing the reception path of stream data can be reduced. For example, the operation of changing the reception path of stream data may be repeated several times so as to configure a path of stream data, allowing minimum delay time. The burden of operation of the server 100 when changing the reception path of a relatively smaller unit of sub-stream data may be smaller than that of the case in which the reception path of a larger unit of stream data is changed. That is, the server 100 may change the reception path of sub-stream data according to a time period, thereby performing efficient traffic distribution.

TABLE 9

Pseudo code (O7) for identification of sub-stream having greatest change gain value

```
max_node_gain(node):return    (maximum    value    of
max_node_substream_gain(<node>, <substream>) for all <substream>)
```

According to various embodiments, when a particular piece of sub-stream data, the reception path of which is to be changed at a current period, is determined, based on execution of pseudo code (O8) in [Table 10] below, when the determination value (max_node_substrsam_gain) of the particular piece of sub-stream data is greater than 0, the control server 110 may transmit, to a higher node (e.g., the first client device 600a) of a different path, a first message (e.g., Startrelay) for controlling to transmit the particular piece of sub-stream data to the second client device 600b, and transmit, to the second client device 600b, a second message (e.g., Upstreamchange) for controlling to receive the particular piece of sub-stream data from a higher node (e.g., the first client device 600a) of the different path. As described above with reference to FIG. 6, when sub-stream data is received from the first client device 600a, based on reception of the second message (e.g., Upstreamchange), the second client device 600b may transmit, to the higher node (e.g., the transmission server 120) of the existing reception path, a third message for requesting to stop transmitting sub-stream data.

TABLE 10

Pseudo code (O8) for calculation of determination value and transmission of message based on determination value

```
On every report period: target_node = <node> allowing max_node_gain(<node>) to
be maximum
target_ss = <substream> allowing max_node_substream_gain(<target_node>,
<substream>) to be maximum
max_gain = max_node_substream_gain(<target_node>, <target_ss>)
If max_gain > 0:
old_upstream = cur_upstream(<target_node>, <target_ss>)
new_upstream = best_upstream(<target_node>, <target_ss>)
Message transmission:
type: StartRelay
Reception: <new_upstream>
Contents: target_node = <target_node>
substream = <target_ss>
Message transmission:
type: UpstreamChange
Reception: <target_node>
Contents: old_upstream = <old_upstream>
new_upstream = <new_upstream>
substream = <target_ss>
```

Hereinafter, an example of operations of a node device according to various embodiments will be described. A description for operations of a node device given above with reference to FIG. 6 (the flowchart 600), FIG. 9 (the flowchart 900), and FIG. 10 (the flowchart 1000) may be employed for operations of a node device described below.

According to various embodiments, a node device (e.g., the client device 200) may transmit probe packet data corresponding to sub-stream data through a different communication path other than the communication path of the sub-stream data.

Figure 11:
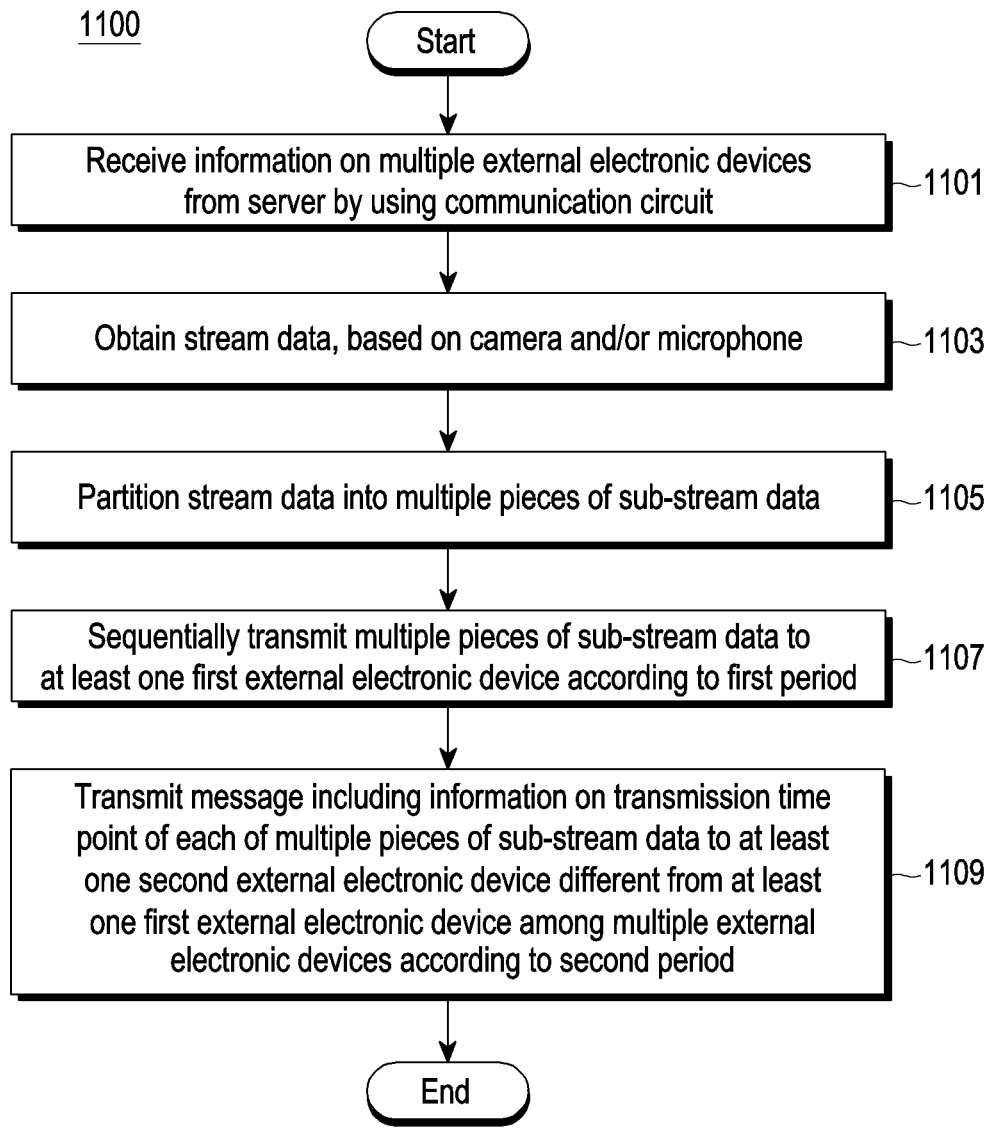
FIG. 11 is a flowchart illustrating an example of operations of a node device according to various embodiments.

FIG. 11 is a flowchart 1100 illustrating an example of operations of a node device according to various embodiments. According to various embodiments, the operations illustrated in FIG. 11 may be performed in various orders without being limited to the illustrated order. In addition, according to various embodiments, more operations or one or more fewer operations may be performed compared to the operations illustrated in FIG. 11. Hereinafter, FIG. 11 will be described with reference to FIG. 12.

Figure 12:
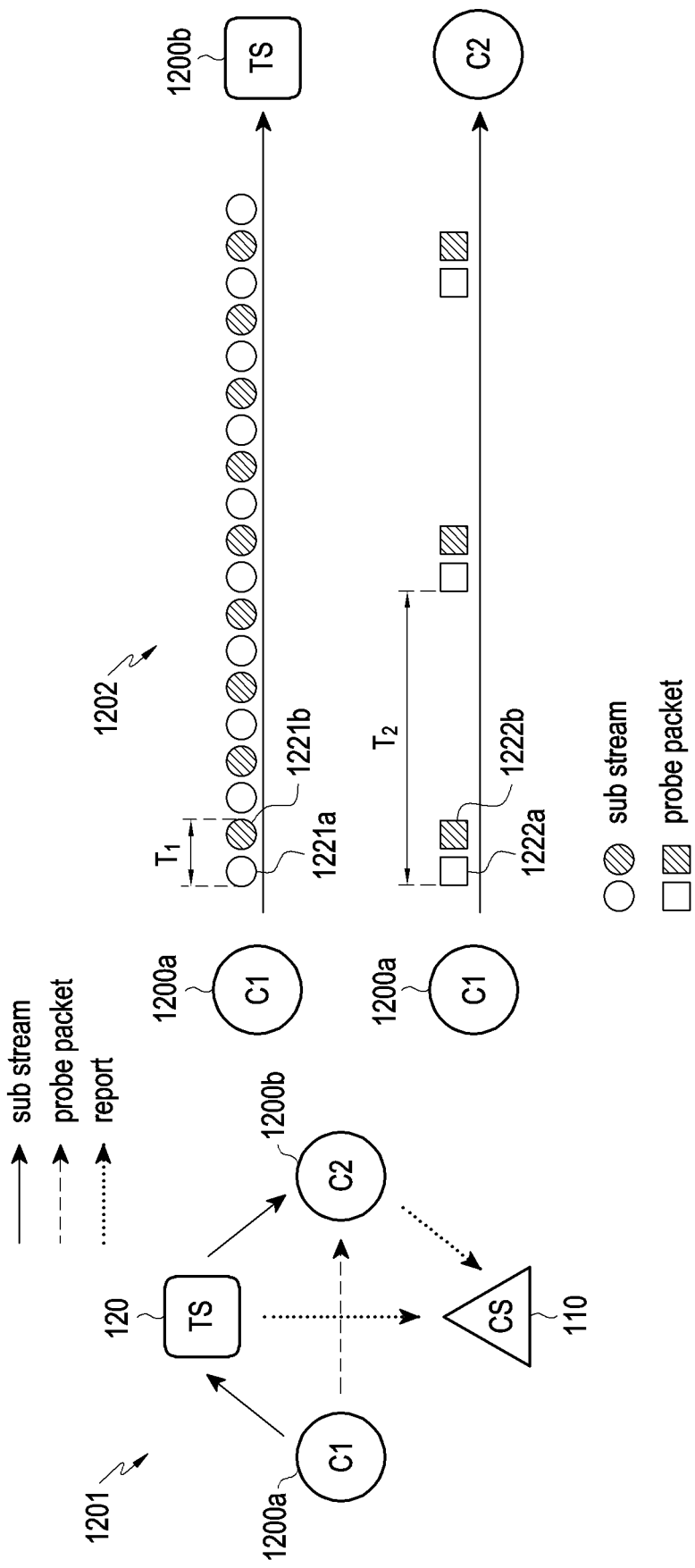
FIG. 12 is a diagram illustrating an example of operations of transmitting sub-stream data and probe packet data by a node device according to various embodiments.

FIG. 12 is a diagram illustrating an example of operations of transmitting sub-stream data and probe packet data by a node device according to various embodiments.

According to various embodiments, anode device (e.g., the client device 200) may, in operation 1101, receive information on multiple external electronic devices from the server 100 by using a communication circuit. For example, referring to FIG. 12, a first client device 1200a may, based on an input to execute an application implemented to provide a user's service (e.g., video conference service), execute the application and access the control server 110. The first client device 1200a may receive list information on other node devices (e.g., the transmission server 120 and a second client device 1200b) from the control server 110. The list information may include each identification information and information (e.g., IP address or MAC address) for establishment of communication with each of the node devices as described above.

According to various embodiments, the node device (e.g., the client device 200) may obtain stream data, based on the camera and/or the microphone in operation 1103, and may partition the stream data into multiple pieces of sub-stream data in operation 1105. For example, the first client device 1200a (e.g., encoder) may generate stream data, based on image information and voice information obtained using an input device. For example, the first client device 1200a may obtain image information by capturing an image of the user by means of a camera, and obtain voice information by obtaining the user's voice by means of a microphone. The first client device 1200a (e.g., forwarding module) may partition the stream data into a designated number of pieces or packets so as to generate multiple pieces of stream data.

According to various embodiments, the node device (e.g., the client device 200) may, in operation 1107, sequentially transmit the multiple pieces of sub-stream data to at least one first external electronic device according to a first period. For example, referring to reference numerals 1201 and 1202 in FIG. 12, the first client device 1200a may sequentially transmit multiple pieces of stream data 1221a and 1221b to the transmission server 120 according to the first period T1 according to a control of the control server 110. As described above, after the multiple pieces of stream data 1221a and 1221b are transmitted to the transmission server 120, the first client device 1200a may also transmit the multiple pieces of stream data 1221a and 1221b to a different node device (e.g., the second client device 1200b) according to control of the control server 110.

According to various embodiments, the node device (e.g., the client device 200) may, in operation 1109, transmit a message including information on a transmission time point for each of the multiple pieces of sub-stream data to at least one second external electronic device different from the at least one first external electronic device in the multiple external electronic devices according to a second period. For example, the first client device 1200a may transmit pieces of probe packet data 1222a and 1222b corresponding to the pieces of sub-stream data 1221a and 1221b to other node devices (e.g., the second client device 1200b) other than the node device of the reception path for sub-stream data according to the second period T2. As indicated by reference numeral 1202 in FIG. 12, the second period T2 may be longer than the first period T1. For example, referring to reference numeral 1202 in FIG. 12, when the first client device 1200a transmits the first piece of sub-stream data 1221a and the second piece of sub-stream data 1221b to the transmission server 120, the first client device 1200a may transmit, to the second client device 1200b that is a different node device, the first piece of probe packet data 1222a generated based on a part of the first piece of sub-stream data 1221a, and the second piece of probe packet data 1222b generated based on a part of the second piece of sub-stream data 1221b. Although not illustrated, if the first client device 1200a transmits the first piece of sub-stream data to the transmission server 120 and transmit the second piece of sub-stream data to the second client device 1200b, the first client device 1200a may transmit the first piece of probe packet data corresponding to the first piece of sub-stream data to the second client device 1200b, and transmit the second piece of probe packet data corresponding to the second piece of sub-stream data to the transmission server 120.

According to various embodiments, a node device (e.g., the second client device 1200b) having received the first piece of sub-stream data 1221a and the second piece of sub-stream data 1221b may transmit the pieces of probe packet data 1222a and 1222b generated based on the first piece of sub-stream data 1221a and the second piece of sub-stream data 1221b to a different node device (not illustrated).

Hereinafter, an example of operations of a node device according to various embodiments will be described. The description for the operations of a node device given above with reference to FIG. 6 (the flowchart 600), FIG. 9 (the flowchart 900), FIG. 10 (the flowchart 1000), and FIG. 11 (the flowchart 1100) may be employed for the operations of a node device described below.

According to various embodiments, anode device (e.g., the client device 200) may calculate delay times of reception paths, based on a sub-stream and/or probe packet data received by the node device according to a designated period, and may transmit a report message to the control server 110.

Figure 13:
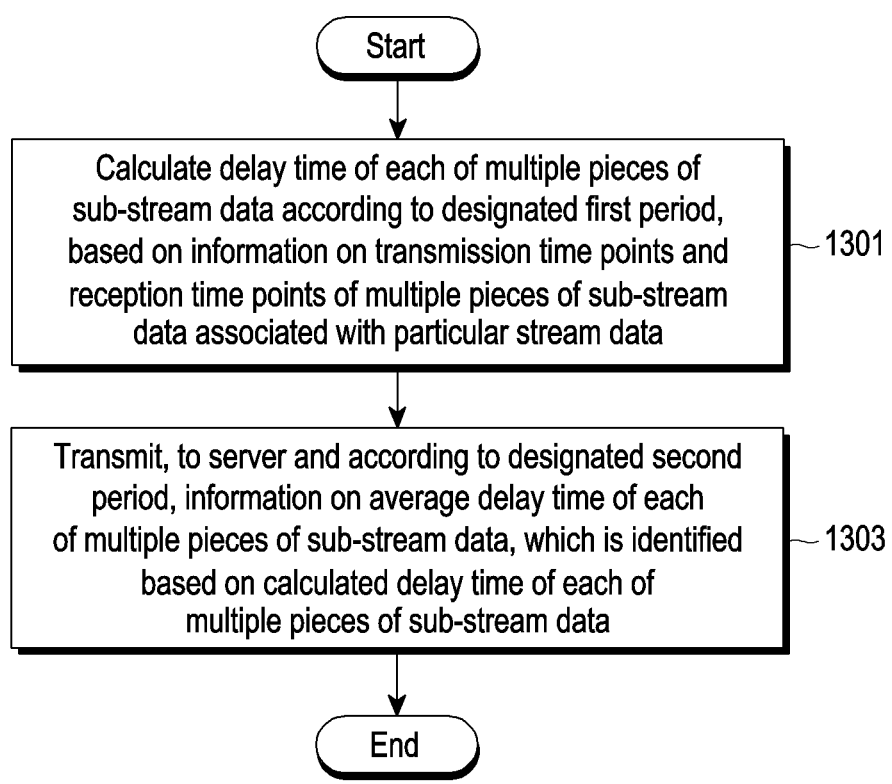
FIG. 13 is a flowchart illustrating an example of operations of a node device according to various embodiments.

FIG. 13 is a flowchart 1300 illustrating an example of operations of a node device according to various embodiments. According to various embodiments, the operations illustrated in FIG. 13 may be performed in various orders without being limited to the illustrated order. In addition, according to various embodiments, more operations or one or more fewer operations may be performed compared to the operations illustrated in FIG. 13. Hereinafter, FIG. 13 will be described with reference to FIG. 14.

Figure 14:
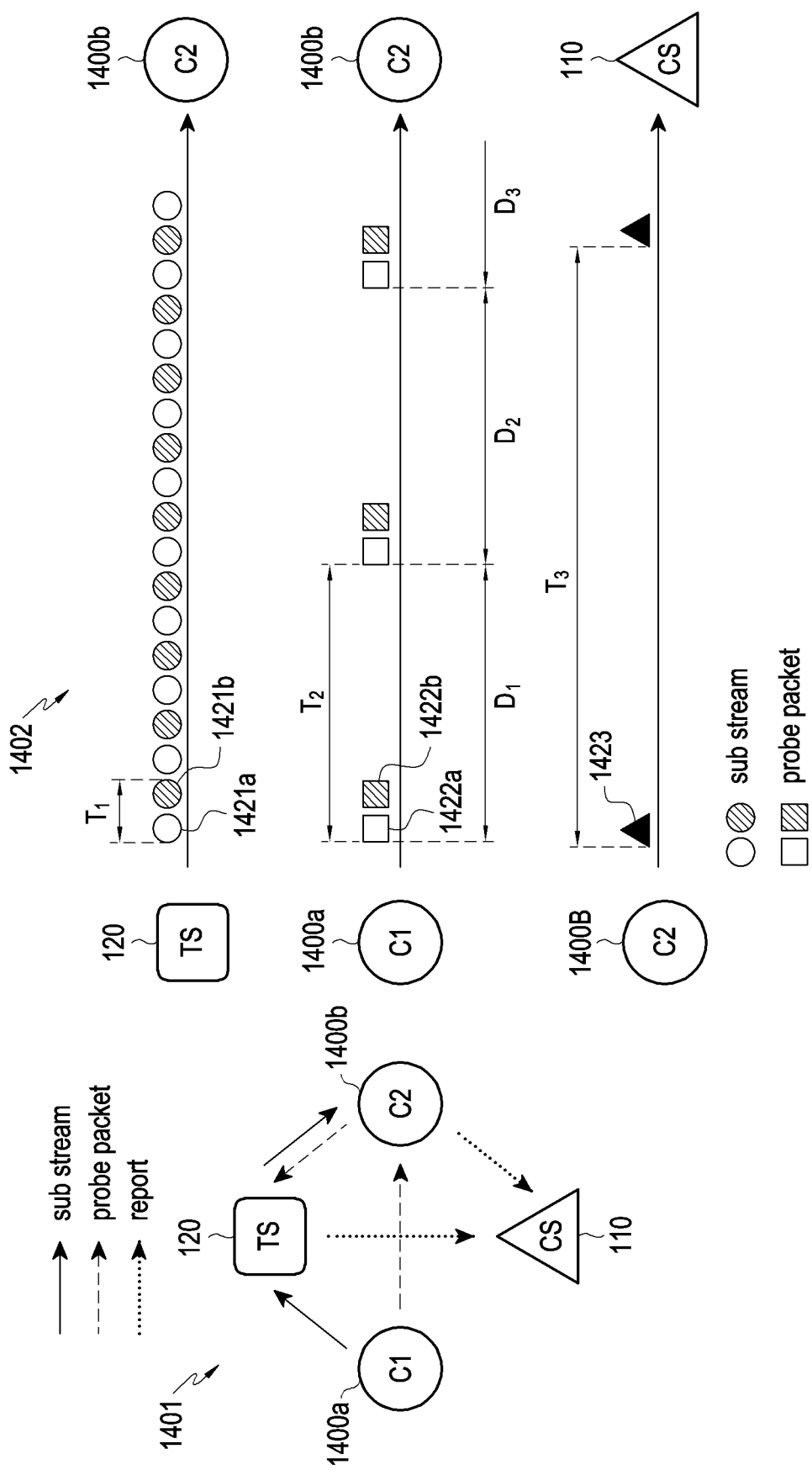
FIG. 14 is a diagram illustrating an example of operations of transmitting sub-stream data and probe packet data by a node device according to various embodiments.

FIG. 14 is a diagram illustrating an example of operations of transmitting sub-stream data and probe packet data by a node device according to various embodiments.

According to various embodiments, anode device (e.g., the client device 200) may, in operation 1301, calculate a delay time of each of multiple pieces of sub-stream data according to a designated first period, based on information on transmission time points and reception time points of the multiple pieces of sub-stream data associated with particular stream data. For example, as indicated by reference numerals 1401 and 1402 in FIG. 14, a second client device 1400b may establish communication with multiple node devices, and, based on the established communication, receive multiple pieces of sub-stream data 1421a and 1421b from the transmission server 120 according to a designated period T1, and receive pieces of probe packet data 1422a and 1422b corresponding to the multiple pieces of sub-stream data 1421a and 1421b from a first client device 1400a according to a designated period T2. In an embodiment, the second client device 1400b may calculate a delay time associated with the reception path (e.g., the transmission server 120) the particular stream data 1421a and 1421b, based on the difference between the generation time (e.g., the time at which the particular stream data 1421a and 1421b is generated and/or replicated by the transmission server 120) of the particular stream data 1421a and 1421b, which is identified from the received particular stream data 1421a and 1421b, and the reception time at which same is received by the second client device 1400b. In addition, in an embodiment, the second client device 1400b may calculate the delay time associated with a reception path (e.g., the first client device 1400a) different from the reception path (e.g., the transmission server 120) of the particular stream data, based on the difference between the reception time of the pieces of probe packet data 1422a and 1422b and the generation time (e.g., the time at which the pieces of probe packet data are generated by the first client device 1400a) of the particular stream data 1421a and 1421b, which is identified from the received pieces of probe packet data 1422a and 1422b corresponding to the particular stream data 1421a and 1421b.

According to various embodiments, the node device (e.g., the client device 200) may, in operation 1303, transmit, to a server and according to a designated second period, information on an average delay time of each of the multiple pieces of sub-stream data, which is identified based on the calculated delay time of each of the multiple pieces of sub-stream data. For example, the second client device 1400b may calculate an average delay time of delay times associated with particular stream data for each reception path (e.g., the transmission server 120 and the first client device 1400a), which is calculated for a designated period T3, and may transmit, to the control server 110, a report message 1423 including information on the calculated average delay time.

According to various embodiments, the node device (e.g., the second client device 1400b) may receive a message controlling to change a higher node, based on transmission of the report message 1423 as described above.

Hereinafter, an example of operations of devices (e.g., the client device 200 and a server) according to various embodiments will be described. The description for the operations of a device given above with reference to FIG. 6 (the flowchart 600), FIG. 9 (the flowchart 900), FIG. 10 (flowchart 1000), and FIG. 11 (the flowchart 1100) may be employed for the operations of devices (e.g., the client device 200 and a server) described below.

According to various embodiments, the control server 110 may identify a delay time of each reception path for probe packet data corresponding to particular sub-stream data of a particular node device, and control a probe packet data transmission period of a higher node of each reception path, based on the identified delay time.

Figure 15:
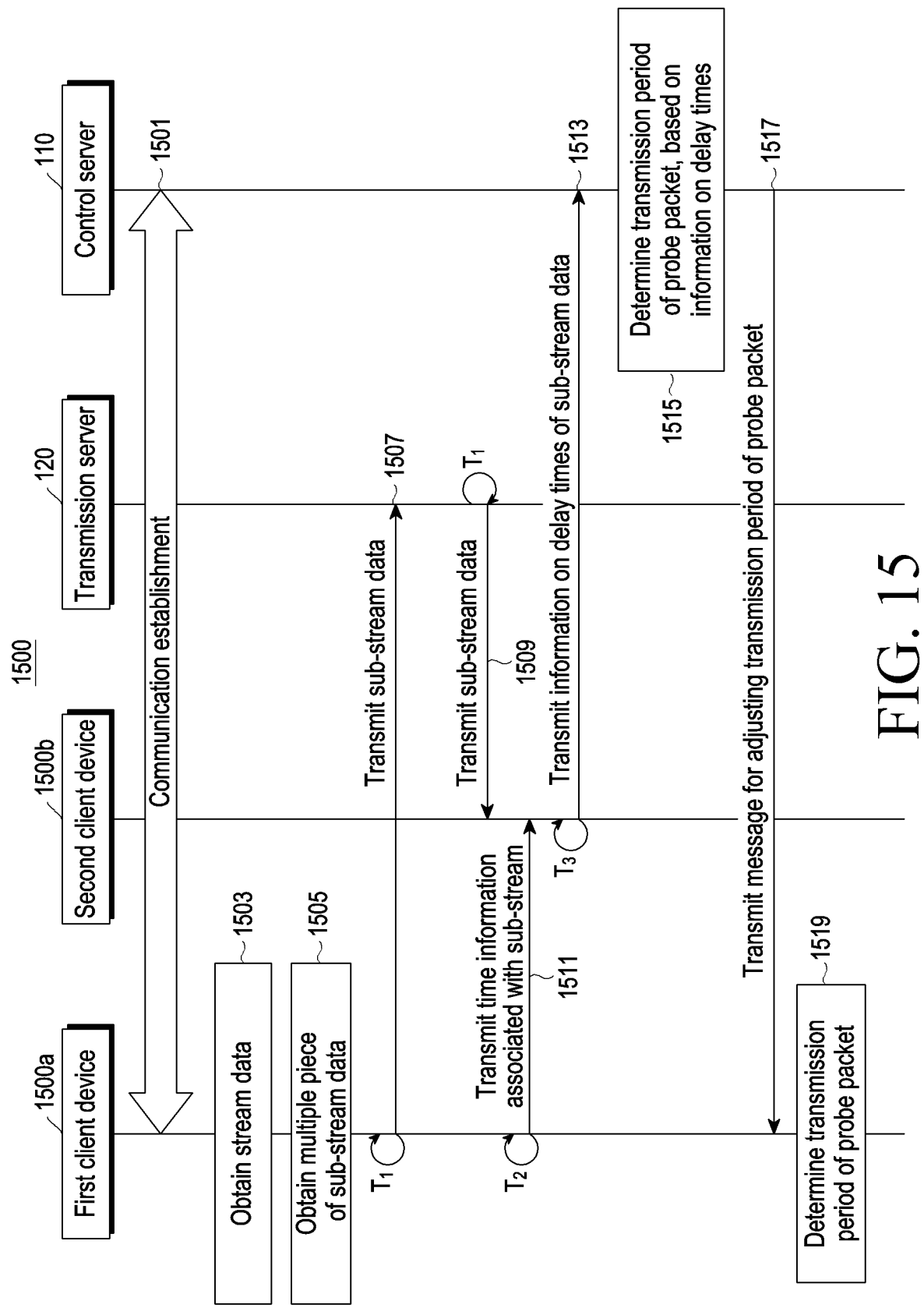
FIG. 15 is a flowchart illustrating an example of operations of devices (e.g., client devices, a transmission server, and a control server) according to various embodiments.

FIG. 15 is a flowchart 1500 illustrating an example of operations of devices (e.g., the client devices 200, the transmission server 120, and the control server 110) according to various embodiments. According to various embodiments, the operations illustrated in FIG. 15 may be performed in various orders without being limited to the illustrated order. In addition, according to various embodiments, more operations or one or more fewer operations may be performed compared to the operations illustrated in FIG. 15.

According to various embodiments, electronic devices (e.g., a first client device 1500a, a second client device 1500b, the transmission server 120, and the control server 110) may, in operation 1501, perform operations of establishing communication. For example, the first client device 1500a, the second client device 1500b, the transmission server 120, and the control server 110 may establish communication with each other. Operation 1501 of the electronic devices (e.g., the first client device 1500a, the second client device 1500b, the transmission server 120, and the control server 110) may be performed as operation 601 of the electronic device (e.g., the first client device 1500a, the second client device 1500b, the transmission server 120, and the control server 110) described above, and thus duplicative description will be omitted.

According to various embodiments, the first client device 1500a may obtain stream data in operation 1503, and obtain multiple pieces of stream data in operation 1505. For example, the first client device 1500a (e.g., an encoder and a forwarding module) may generate stream data, based on image data and/or voice data obtained using an input device, and partition the stream data into a designated number of pieces to generate multiple pieces of sub-stream data. The operations of the encoder and the forwarding module may be performed as described above with reference to FIG. 4 and FIG. 5, and thus duplicative description will be omitted.

According to various embodiments, the first client device 1500a may, in operation 1507, sequentially transmit the multiple pieces of sub-stream data to the transmission server 120. The transmission server 120 may, in operation 1509, sequentially transmit the received multiple pieces of sub-stream data to the second client device 1500b.

According to various embodiments, the first client device 1500a may, in operation 1511, transmit probe packet data associated with each of the multiple pieces of sub-stream data according to a designated period T2. For example, each node device may transmit, to a node device different from lower node of the transmission path of each of multiple sub-streams, probe packet data of each sub-stream. As described above with reference to FIG. 5, the probe packet data may include information for identification of the sub-stream and information on a generation time of the sub-stream. For example, the first client device 1500a may transmit probe packet data of each of multiple sub-streams to the second client device 1500b, which is different from the transmission server 120, which is the lower node of the transmission path of sub-stream data.

According to various embodiments, the second client device 1500b may, in operation 1513, transmit information on delay times of sub-stream data. For example, the second client device 1500b may calculate delay times of reception paths of each of multiple sub-streams, and delay times of reception paths of each of pieces of probe packet data corresponding to the multiple sub-streams, and transmit a report message 720 including information on the calculated delay times to the control server 110 according to a designated period.

According to various embodiments, the control server 110 may, in operation 1515, determine a transmission period for probe packets, based on the information on the delay times. For example, the control server 110 may calculate change gain values, based on the information on delay times of reception paths of probe packet data of particular sub-stream data of a particular node device, and control the transmission period of the probe packet data of at least some of higher nodes of the reception paths, based on the calculated change gain values.

In an embodiment, the control server 110 may control the transmission period of probe packet data of a higher node of each reception path according to a range including a change gain value for each reception path of the probe packet data. For example, the range may include a first range, a second range higher than the first range, and a third range higher than the second range. When the third range includes a change gain value, this may indicate that a higher node corresponding to the corresponding change gain value corresponds to a reception path having low delay time for particular sub-stream data. Accordingly, when the change gain value is included in the third range, the control server 110 may determine to maintain the transmission period of probe packet data of the higher node having the corresponding change gain value to have a predetermined value, or to reduce same to be smaller than the current value. Therefore, frequent change of the reception path may be possible. In addition, for example, when the change gain value is included in the first range which is the lowest, the control server 110 may determine to stop a higher node having the corresponding change gain value from transmitting probe packet data. In addition, for example, when the change gain value is included in the second range, the control server 110 may identify a change gain value for a designated time period while maintaining the transmission period of probe packet data of the higher node having the corresponding change gain value, and determine whether the change gain value improves to be included in the third range during the designated time period. When the change gain value within the second range is changed to be included in the third range within the designated time period, the control server 110 may determine to maintain and/or reduce the transmission period of probe packet data of the higher node even after passage of the designated time period. When the change gain value is continuously included in the second range for a designated time, the control server 110 may determine to stop a higher node from transmitting probe packet data after passage of the designated time.

In an embodiment, the control server 110 may control the transmission period of probe packet data of the higher node of each reception path according to the ranking of a change gain value for each reception path of the probe packet data. For example, the control server 110 may determine the transmission period of probe packet data of the higher node, to be inversely proportional to a change gain value. In addition, for example, the control server 110 may determine the ranking of the higher node of each reception path in the order from the largest change gain value to the smallest, and determine the transmission period of probe packet data of the higher node, based on the ranking. For example, the control server 110 may determine, to be a first period, a period of probe packet data of the higher node included in a first ranking range included a designated number of rankings from the highest ranking, and may determine, to be a second period longer than the first period, a period of a probe packet data of the higher node included in a second ranking range lower than the first ranking range.

The control server 110 has been described to control a transmission period of probe packet data, based on a change gain value. However, the disclosure is not limited to the above description, the control server may control the transmission period of probe packet data, based on the delay time. For example, similarly to the transmission period configured to be inversely proportional to the change gain value, the transmission period may be configured to be proportional to a delay time.

According to various embodiments, the control server 110 may, in operation 1517, transmit a message for adjusting the transmission period of a probe packet. For example, as described above in operation 1515, the control server 110 may transmit, to the corresponding higher node (e.g., the first client device 1500*a*), a message for allowing transmitting probe packet data according to a transmission period determined for each higher node, and/or a message for controlling to stop transmitting probe packet data.

According to various embodiments, the first client device 1500*a* may, in operation 1519, determine a transmission period of a probe packet, based on a received message. The first client device 1500*a* may transmit a probe packet for particular sub-stream data according to a determined transmission period.

Various embodiments may provide a server (e.g., the control server 110 in FIG. 4) may include a communication circuit (e.g., the first communication circuit 430 in FIG. 4), and at least one processor (e.g., the first processor 440 in FIG. 4), wherein the at least one processor (e.g., the first processor 440 in FIG. 4) is configured to establish communication with multiple external electronic devices by using the communication circuit (e.g., the first communication circuit 430 in FIG. 4), receive report information on a delay time of each of multiple pieces of sub-stream data associated with a particular stream data from a first external electronic device in the multiple external electronic devices by using the communication circuit (e.g., the first communication circuit 430 in FIG. 4), identify a second external electronic device transmitting a particular piece of sub-stream data of the multiple pieces of sub-stream data to the first external electronic device, identify, based on the report information, a first delay time of the particular piece of sub-stream data associated with the second external electronic device, and a second delay time of the particular piece of sub-stream data associated with a third external electronic device different from the second external electronic device in the multiple external electronic devices, and determine, based on the first delay time and the second delay time, whether the second external electronic device or the third external electronic device is to transmit the particular piece of sub-stream data to the first external electronic device.

Various embodiments may provide the server (e.g., the control server 110 in FIG. 4), wherein the at least one processor (e.g., the first processor 440 in FIG. 4) is configured to identify a gain value associated with a ratio of the first delay time to the second delay time, and determine, based on the identified gain value and a pre-configured threshold value, whether the second external electronic device or the third external electronic device is to transmit the particular piece of sub-stream data to the first external electronic device.

Various embodiments may provide the server (e.g., the control server 110 in FIG. 4), wherein the at least one processor (e.g., the first processor 440 in FIG. 4) is configured to identify, based on the report information, at least one third delay time of the particular piece of sub-stream data associated with at least one fourth external electronic device different from the second external electronic device and the third external electronic device in the multiple external electronic devices, identify at least one first gain value associated with a ratio of the first delay time to the at least one third delay time, and determine, based on identification of greater of the gain value and the at least one first gain value, whether second external electronic device, the third external electronic device is, or the at least one fourth external electronic device is to transmit the particular piece of sub-stream data to the first external electronic device.

Various embodiments may provide the server (e.g., the control server 110 in FIG. 4), wherein the at least one processor (e.g., the first processor 440 in FIG. 4) is configured to identify a determination value that is a difference between the gain value and the threshold value, when the determination value is greater than a designated value, determine the third external electronic device is to transmit the particular piece of sub-stream data, and when the determination value is smaller than a designated value, determine the second external electronic device is to transmit the particular piece of sub-stream data.

Various embodiments may provide the server (e.g., the control server 110 in FIG. 4), wherein the at least one processor (e.g., the first processor 440 in FIG. 4) is configured to determine the threshold value, based on node types of the first external electronic device and the third external electronic device, and wherein the node type includes a client device or a transmission server device.

Various embodiments may provide the server (e.g., the control server 110 in FIG. 4), wherein the at least one processor (e.g., the first processor 440 in FIG. 4) is configured to, when the node type of the first external electronic device is the transmission server device and the node type of the third external electronic device is the client device, determine a first threshold value, when the node type of the first external electronic device is the client device and the node type of the third external electronic device is the transmission server device, determine a second threshold value, and when the node type of the first external electronic device and the node type of the third external electronic device correspond to each other, determine a third threshold value.

Various embodiments may provide the server (e.g., the control server 110 in FIG. 4), wherein a magnitude of the first threshold value and a magnitude of the second threshold value are determined based on a parameter value associated with a cost of running the server (e.g., the control server 110 in FIG. 4) and a parameter value associated with a transmission quality.

Various embodiments may provide the server (e.g., the control server 110 in FIG. 4), wherein the at least one processor (e.g., the first processor 440 in FIG. 4) is configured to, when the determination value is greater than the designated value, transmit, to the third external electronic device, a first message for controlling to transmit the particular piece of sub-stream data to the first external electronic device (e.g., the node device 400 in FIG. 4), and transmit, to the first external electronic device, a second message for controlling to stop receiving the particular piece of sub-stream data from the second external electronic device.

Various embodiments may provide the server (e.g., the control server 110 in FIG. 4), wherein the at least one processor (e.g., the first processor 440 in FIG. 4) is configured to identify, based on the report information, multiple determination values, based on identification of multiple change gain values and multiple threshold values associated with the multiple pieces of sub-stream data, identify the particular piece of sub-stream data corresponding to a highest determination value in the multiple determination values, and determine, based on the identification of the particular piece of sub-stream data, a device to transmit the particular piece of sub-stream data to the first external electronic device.

Various embodiments may provide the server (e.g., the control server 110 in FIG. 4), wherein the at least one processor (e.g., the first processor 440 in FIG. 4) is configured to receive the report information according to a first period, and identify one piece of sub-stream data corresponding to the highest determination value in the multiple determination values according to the first period.

Various embodiments may provide the server (e.g., the control server 110 in FIG. 4), wherein the at least one processor (e.g., the first processor 440 in FIG. 4) is configured to identify, based on the report information, multiple change gain values associated with different external electronic devices other than the first external electronic device and the second external electronic device in the multiple external electronic devices, and control, based on the multiple change gain values, a transmission period of a probe packet data corresponding to the particular piece of sub-stream data transmitted by the different external electronic devices to the first external electronic device.

Various embodiments may provide the server (e.g., the control server 110 in FIG. 4), wherein the at least one processor (e.g., the first processor 440 in FIG. 4) is configured to transmit a message for controlling to stop transmitting the probe packet data, to an external electronic device corresponding to a change gain value included in a first range in the multiple change gain values.

Various embodiments may provide the server (e.g., the control server 110 in FIG. 4), wherein the at least one processor (e.g., the first processor 440 in FIG. 4) is configured to control the transmission period of the probe packet data of the different external electronic devices to be inversely proportional to the multiple change gain values.

Various embodiments may provide the server (e.g., the control server 110 in FIG. 4), wherein the at least one processor (e.g., the first processor 440 in FIG. 4) is configured to, when a message notifying that the particular stream data is not received is received by the second external electronic device from the first external electronic device, exclude the second external electronic device from the multiple external electronic devices.

Various embodiments may provide an electronic device (e.g., the node device 400 in FIG. 4) including a communication circuit (e.g., the second communication circuit 480 in FIG. 4), a camera (e.g., the camera 411 in FIG. 4), a microphone (e.g., the microphone 413 in FIG. 4), and at least one processor (e.g., the second processor 460 in FIG. 4), wherein the at least one processor (e.g., the second processor 460 in FIG. 4) is configured to receive information on multiple external electronic devices from a server (e.g., the control server 110 in FIG. 4) by using the communication circuit (e.g., the second communication circuit 480 in FIG. 4), obtain stream data, based on the camera (e.g., the camera 411 in FIG. 4) and/or the microphone (e.g., the microphone 413 in FIG. 4), partition the stream data into multiple pieces of sub-stream data, sequentially transmit the multiple pieces of sub-stream data to at least one first external electronic device according to a first period, and transmit a message including information on a transmission time point for each of the multiple pieces of sub-stream data to at least one second external electronic device different from the at least one first external electronic device in the multiple external electronic devices according to a second period.

Various embodiments may provide the electronic device (e.g., the node device 400 in FIG. 4), wherein the second period is longer than the first period.

Various embodiments may provide the electronic device (e.g., the node device 400 in FIG. 4), wherein the at least one processor (e.g., the first processor 440 in FIG. 4) is configured to, based on acquisition of at least a part of each of the multiple pieces of sub-stream data, generate the message including the information on the transmission time point for each of the multiple pieces of sub-stream data.

Various embodiments may provide an electronic device (e.g., the node device 400 in FIG. 4) including a communication circuit (e.g., the second communication circuit 480 in FIG. 4), a camera, a microphone, and at least one processor (e.g., the second processor 460 in FIG. 4), wherein the at least one processor (e.g., the second processor 460 in FIG. 4) is configured to calculate a delay time of each of multiple pieces of sub-stream data associated with particular stream data according to a designated first period, based on information on generation time points and reception time points of the multiple pieces of sub-stream data, and transmit, according to a designated second period and to a server (e.g., the control server 110 in FIG. 4), information on an average delay time of each of the multiple pieces of sub-stream data, which is identified based on the calculated delay time of each of the multiple pieces of sub-stream data.

Various embodiments may provide an electronic device (e.g., the node device 400 in FIG. 4) wherein the at least one processor (e.g., the first processor 440 in FIG. 4) is configured to obtain the information on generation time points of the multiple pieces of sub-stream data, based on reception of the multiple pieces of sub-stream data.

Various embodiments may provide an electronic device (e.g., the node device 400 in FIG. 4) wherein the at least one processor (e.g., the first processor 440 in FIG. 4) is configured to obtain the information on generation time points of the multiple pieces of sub-stream data, based on reception of multiple pieces of probe packet data corresponding to the multiple pieces of sub-stream data.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A server comprising:
a communication circuit; and
at least one processor, wherein the at least one processor is configured to:
establish communication with multiple external electronic devices by using the communication circuit,
receive report information on a delay time of each of multiple pieces of sub-stream data associated with a particular stream data from a first external electronic device in the multiple external electronic devices by using the communication circuit,
identify a second external electronic device transmitting a particular piece of sub-stream data of the multiple pieces of sub-stream data to the first external electronic device,
identify, based on the report information, a first delay time of the particular piece of sub-stream data associated with the second external electronic device, and a second delay time of the particular piece of sub-stream data associated with a third external electronic device different from the second external electronic device in the multiple external electronic devices, and
determine, based on the first delay time and the second delay time, whether the second external electronic device or the third external electronic device is to transmit the particular piece of sub-stream data to the first external electronic device.

2. The server of claim 1, wherein the at least one processor is configured to:
identify a gain value associated with a ratio of the first delay time to the second delay time, and
determine, based on the identified gain value and a pre-configured threshold value, whether the second external electronic device or the third external electronic device is to transmit the particular piece of sub-stream data to the first external electronic device.

3. The server of claim 2, wherein the at least one processor is configured to:
identify, based on the report information, at least one third delay time of the particular piece of sub-stream data associated with at least one fourth external electronic device different from the second external electronic device and the third external electronic device in the multiple external electronic devices,
identify at least one first gain value associated with a ratio of the first delay time to the at least one third delay time, and
determine, based on identification of greater of the gain value and the at least one first gain value, whether the second external electronic device, the third external electronic device is, or the at least one fourth external electronic device is to transmit the particular piece of sub-stream data to the first external electronic device.

4. The server of claim 2, wherein the at least one processor is configured to:
identify a determination value that is a difference between the gain value and the threshold value,
when the determination value is greater than a designated value, determine the third external electronic device is to transmit the particular piece of sub-stream data, and
when the determination value is smaller than the designated value, determine the second external electronic device is to transmit the particular piece of sub-stream data.

5. The server of claim 4, wherein the at least one processor is configured to:
determine the threshold value, based on node types of the first external electronic device and the third external electronic device, and
wherein the node type includes a client device or a transmission server device.

6. The server of claim 5, wherein the at least one processor is configured to:
when the node type of the first external electronic device is the transmission server device and the node type of the third external electronic device is the client device, determine a first threshold value,
when the node type of the first external electronic device is the client device and the node type of the third external electronic device is the transmission server device, determine a second threshold value, and
when the node type of the first external electronic device and the node type of the third external electronic device correspond to each other, determine a third threshold value.

7. The server of claim 6, wherein a magnitude of the first threshold value and a magnitude of the second threshold value are determined based on a parameter value associated with a cost of running the server and a parameter value associated with a transmission quality.

8. The server of claim 4, wherein the at least one processor is configured to:
when the determination value is greater than the designated value, transmit, to the third external electronic device, a first message for controlling to transmit the particular piece of sub-stream data to the first external electronic device, and transmit, to the first external electronic device, a second message for controlling to stop receiving the particular piece of sub-stream data from the second external electronic device.

9. The server of claim 5, wherein the at least one processor is configured to:
identify, based on the report information, multiple determination values, based on identification of multiple change gain values and multiple threshold values associated with the multiple pieces of sub-stream data,
identify the particular piece of sub-stream data corresponding to a highest determination value in the multiple determination values, and
determine, based on the identification of the particular piece of sub-stream data, a device to transmit the particular piece of sub-stream data to the first external electronic device.

10. The server of claim 9, wherein the at least one processor is configured to:
receive the report information according to a first period, and
identify one piece of sub-stream data corresponding to the highest determination value in the multiple determination values according to the first period.

11. The server of claim 3, wherein the at least one processor is configured to:
identify, based on the report information, multiple change gain values associated with different external electronic devices other than the first external electronic device and the second external electronic device in the multiple external electronic devices, and control, based on the multiple change gain values, a transmission period of a probe packet data corresponding to the particular piece of sub-stream data transmitted by the different external electronic devices to the first external electronic device.

12. The server of claim 11, wherein the at least one processor is configured to:
transmit a message for controlling to stop transmitting the probe packet data, to an external electronic device corresponding to a change gain value included in a first range in the multiple change gain values.

13. The server of claim 11, wherein the at least one processor is configured to:
control the transmission period of the probe packet data of the different external electronic devices to be inversely proportional to the multiple change gain values.

14. The server of claim 1, wherein the at least one processor is configured to:
when a message notifying that the particular stream data is not received is received by the second external electronic device from the first external electronic device, exclude the second external electronic device from the multiple external electronic devices.

15. An electronic device comprising:
a communication circuit;
a camera;
a microphone; and
at least one processor, wherein the at least one processor is configured to:
receive information on multiple external electronic devices from a server by using the communication circuit,
obtain stream data, based on the camera and/or the microphone,
partition the stream data into multiple pieces of sub-stream data,
sequentially transmit the multiple pieces of sub-stream data to at least one first external electronic device according to a first period, and
transmit a message including information on a transmission time point of each of the multiple pieces of sub-stream data to at least one second external electronic device different from the at least one first external electronic device in the multiple external electronic devices according to a second period.

16. The electronic device of claim 15, wherein the second period is longer than the first period.

17. The electronic device of claim 15, wherein the at least one processor is configured to, based on acquisition of at least a part of each of the multiple pieces of sub-stream data, generate the message including the information on the transmission time point of each of the multiple pieces of sub-stream data.

18. An electronic device comprising:
a communication circuit;
a camera;
a microphone; and
at least one processor, wherein the at least one processor is configured to:
calculate a delay time of each of multiple pieces of sub-stream data associated with particular stream data according to a designated first period, based on information on generation time points and reception time points of the multiple pieces of sub-stream data, and
transmit, according to a designated second period and to a server, information on an average delay time of each of the multiple pieces of sub-stream data, which is identified based on the calculated delay time of each of the multiple pieces of sub-stream data.

19. The electronic device of claim 18, wherein the at least one processor is configured to:
obtain the information on generation time points of the multiple pieces of sub-stream data, based on reception of the multiple pieces of sub-stream data.

20. The electronic device of claim 18, wherein the at least one processor is configured to:
obtain the information on generation time points of the multiple pieces of sub-stream data, based on reception of multiple pieces of probe packet data corresponding to the multiple pieces of sub-stream data.

* * * * *